(12) United States Patent
Babakhani et al.

(10) Patent No.: US 7,812,775 B2
(45) Date of Patent: Oct. 12, 2010

(54) MM-WAVE FULLY INTEGRATED PHASED ARRAY RECEIVER AND TRANSMITTER WITH ON-CHIP ANTENNAS

(75) Inventors: Aydin Babakhani, Pasadena, CA (US); Xiang Guan, Mountain View, CA (US); Seyed Ali Hajimiri, Pasadena, CA (US); Abbas Komijani, Mountain View, CA (US); Arun Natarajan, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 948 days.

(21) Appl. No.: 11/525,757

(22) Filed: Sep. 22, 2006

(65) Prior Publication Data

US 2010/0231452 A1 Sep. 16, 2010

Related U.S. Application Data

(60) Provisional application No. 60/720,228, filed on Sep. 23, 2005.

(51) Int. Cl.
*H01Q 19/06* (2006.01)
*H01Q 15/06* (2006.01)

(52) U.S. Cl. .................... 343/754; 343/793; 343/795; 343/911 R

(58) Field of Classification Search ............ None
See application file for complete search history.

(56) References Cited

U.S. PATENT DOCUMENTS 6,130,640 A   10/2000  Uematsu et al.
6,137,434 A * 10/2000  Tohya et al. ............... 342/70
6,822,615 B2 * 11/2004  Quan et al. ................ 343/754
7,109,922 B2 *  9/2006  Shmuel .................. 343/700 MS
7,595,766 B2 *  9/2009  Rofougaran ............... 343/795
2007/0285314 A1 * 12/2007  Mortazawi et al. .......... 342/375
2009/0267822 A1 * 10/2009  Shinoda et al. ............. 342/70

OTHER PUBLICATIONS

Menzel, W.: "Interconnects and Packaging of Millimeter Wave Circuits." Millimeter Waves, 1997 Topical Symposium on Kanagawa, Japan. July 7-8, 1997, New York, NY USA, pp. 55-58, Figs 5-7.

(Continued)

*Primary Examiner*—Trinh V Dinh
(74) *Attorney, Agent, or Firm*—Milstein Zhang & Wu LLC; Joseph B. Milstein

(57) ABSTRACT

A phased array mm-wave device includes a substrate, a mm-wave transmitter integrated onto the substrate configured to transmit a mm-wave signal and/or a mm-wave receiver integrated onto the substrate and configured to receive a mm-wave signal. The mm-wave device also includes a phased array antenna system integrated onto the substrate and including two or more antenna elements. The phased array mm-wave device also includes one or more dielectric lenses. A distributed mm-wave distributed combining tree circuit includes at least two pairs of differential transconductors with regenerative degeneration and accepts at least two differential input signals. Two mm-wave loopback methods measure the phased array antenna patterns and the performance of an integrated receiver transmitter system.

30 Claims, 33 Drawing Sheets

OTHER PUBLICATIONS

D. Rutledge, IEEE Antennas and Propagation Society Newsletter, pp. 4-8, Aug. 1985.

A. Babakhani, X. Guan, A. Komijani, A Natarajan, and A. Hajimiri, "A 77-GHz Phased-Array Transceiver With On-Chip Antennas in Silicon: Receiver and Antennas", IEEE Journal of Solid-State Circuits, vol. 41, No. 12, pp. 2795-2806, Dec. 2006.

A.J. Joseph, D.L. Harame, B. Jagannathan, D. Coolbaugh, D. Ahlgren, J. Magerlein, L. Lanzerotti, N. Feilchenfeld, S. St Onge, J. Dunn, and E. Nowak, "Status and Direction of Communication Technologies—SiGe BiCMOS and RFCMOS," *Proceeding of the IEEE*, vol. 93, No. 9, pp. 1539-1558, Sep. 2005.

Xiang Guan, H. Hashemi, and A. Hajimiri, "A Fully Integrated 24-GHz Eight-Element Phased-Array Receiver in Silicon," *IEEE Journal of Solid-State Circuits*, vol. 39, No. 12, pp. 2311-2320, Dec. 2004.

B.A. Floyd, S.K. Reynolds, U.R. Pfeiffer, T. Zwick, T. Beukema, and B. Gaucher, "SiGe Bipolar Transceiver Circuits Operating at 60GHz," *IEEE Journal of Solid-State Circuits*, vol. 40, No. 1, pp. 156-167, Jan. 2005.

B. Razavi, "A 60-GHz CMOS Receiver Front-End," *IEEE Journal of Solid-State Circuits*, vol. 41, No. 1, pp. 17-22, Jan. 2005.

Chinh H. Doan, Sohrab Emami, Ali M. Niknejad, and Robert W. Brodersen, "Millimeter-Wave CMOS Design," *IEEE Journal of Solid-State Circuits*, vol. 40, No. 1, pp. 144-155, Jan. 2005.

Federal Communications Commission, FCC Part 15, Section 15.253, pp. 1-2, Oct. 1, 2005.

A. Komijani and A. Hajimiri, "A Wideband 77GHz, 17.5dBm Power Amplifier in Silicon," *California Institute of Technology, Dept. of Electrical Engineering*, pp. pp. 1-4.

D.B. Rutledge, et al., "Integrated-Circuit Antennas," *Infrared and Millimeter-Waves*, New York: Academic Press, Inc, pp. 1-90, 1983.

B. Chantraine-Bares, R. Sauleau, L. Le Coq, and K. Mahdjoubi, "A New Accurate Design Method for Millimeter-Wave Homogeneous Dielectric Substrate Lens Antennas of Arbitrary Shape," *IEEE Trans. Antennas and Propagation*, vol. 53. No. 3, pp. 1069-1082, Mar. 2005.

D.F. Filipovic, G.P. Gauthier, S. Raman, and G.M. Rebeiz, "Off-Axis Properties of Silicon and Quartz Dielectric Lens Antennas," *IEEE Trans. Antennas and Propagation*, vol. 45, No. 5, pp. 760-766, May 1997.

T. Nagatsuma et al., "Millimeter-Wave Photonic Integrated Circuit Technologies for High-Speed Wireless Communications Applications," *IEEE Int. Solid-State Circuits Conf. (ISSCC) Dig. Tech. Papers*, pp. 1-7, Feb. 2004.

M.J.M. Van Der Vorst, P.J.I. De Maagt, and M.H.A.J. Herben, "Effect of Internal Reflections on the Radiation Properties and Input Admittance of Integrated Lens Antennas," *IEEE Trans. Microwave Theory and Techniques*, vol. 47, No. 9, pp. 1696-1704, Sep. 1999.

P. Focardi, W.R. MC Grath, and A. Neto, Design Guidelines for Terahertz Mixers and Detectors, *IEEE Transactions on Microwave Theory and Techniques*, vol. 53, No. 5, pp. 1653-1661, May 2005.

T. Al-Attar, A. Hassibi, and T.H. Lee, "A 77GHz Monolithic IMPATT Transmitter in Standard CMOS Technology," *IEEE MTT-S International Microwave Symposium*, pp. 1571-1574, Jun. 12-17, 2005.

T. Al-Attar and T.H. Lee, "Monolithic Integrated Millimeter-Wave Impatt Transmitter in Standard CMOS Technology," *IEEE Transactions on Microwave Theory and Techniques*, vol. 53, No. 11, pp. 3557-3561, Nov. 2005.

A. Babakhani, X. Guan, A. Komijani, A. Natarajan, and A. Hajimiri, "A 77GHz 4-Element Phased-Array Receiver with On-Chip Dipole Antennas in Silicon," *IEEE Int. Solid-State Circuits Conf. (ISSCC) Dig. Tech. Papers*, pp. 3-5, Feb. 2006.

A. Natarajan, A. Komijani, X. Guan, A. Babakhani, Y. Wang, A. Hajimiri, "A 77GHz Phased-Array Transmitter with Local LO-Path Phase-Shifting in Silicon," 2006 *IEE International Solid-State Circuits Conference*, pp. 182-183 and 646.

B. Jagannathan et al., "Self-Aligned SiGe NPN Transistors With 285GHz $f_{max}$ and 207GHz $f_t$ in a Manufacturable Technology," *IEEE Electron Device Ltrs.*, vol. 23, No. 5, pp. 258-260, May 2002.

\* cited by examiner

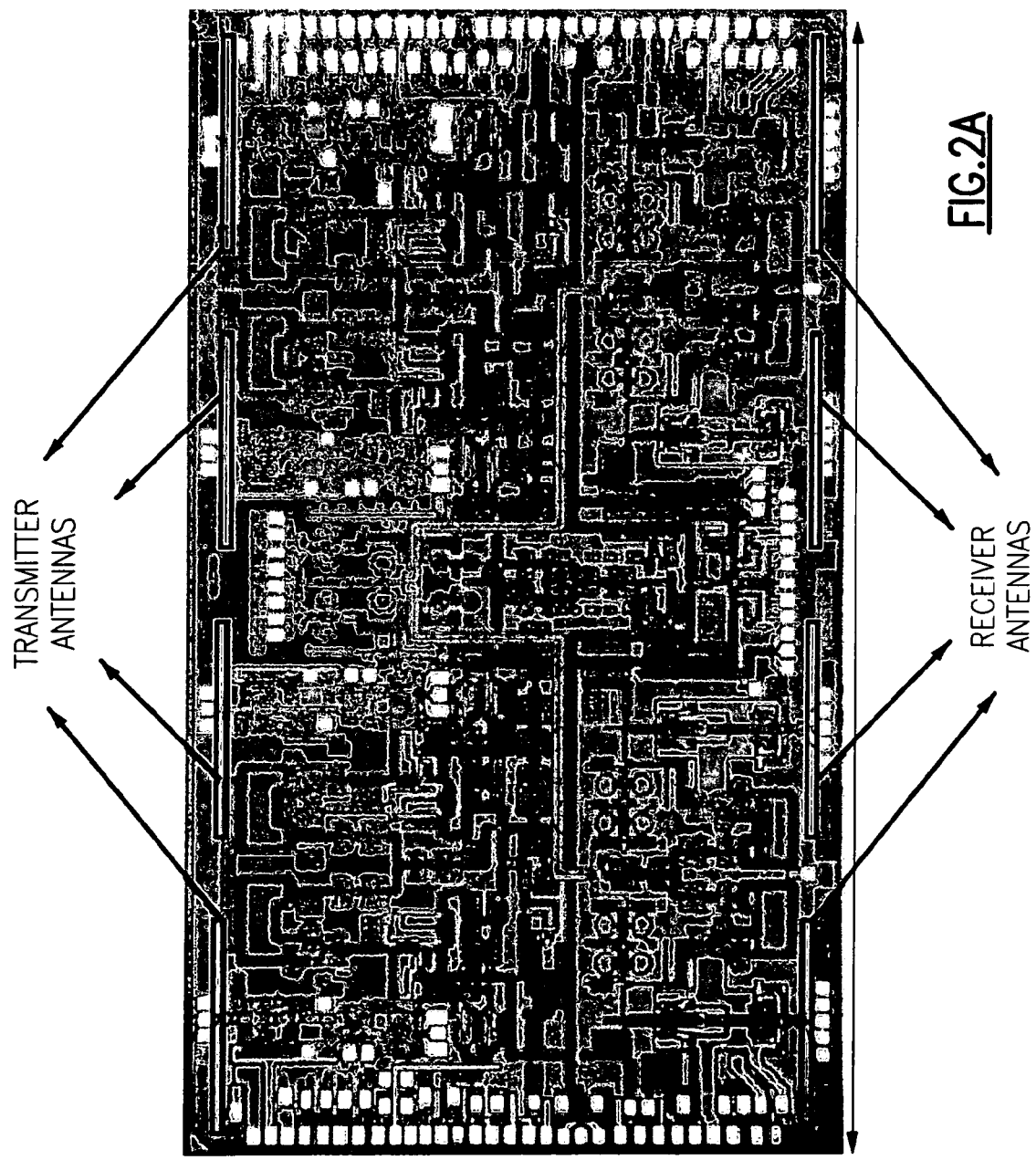

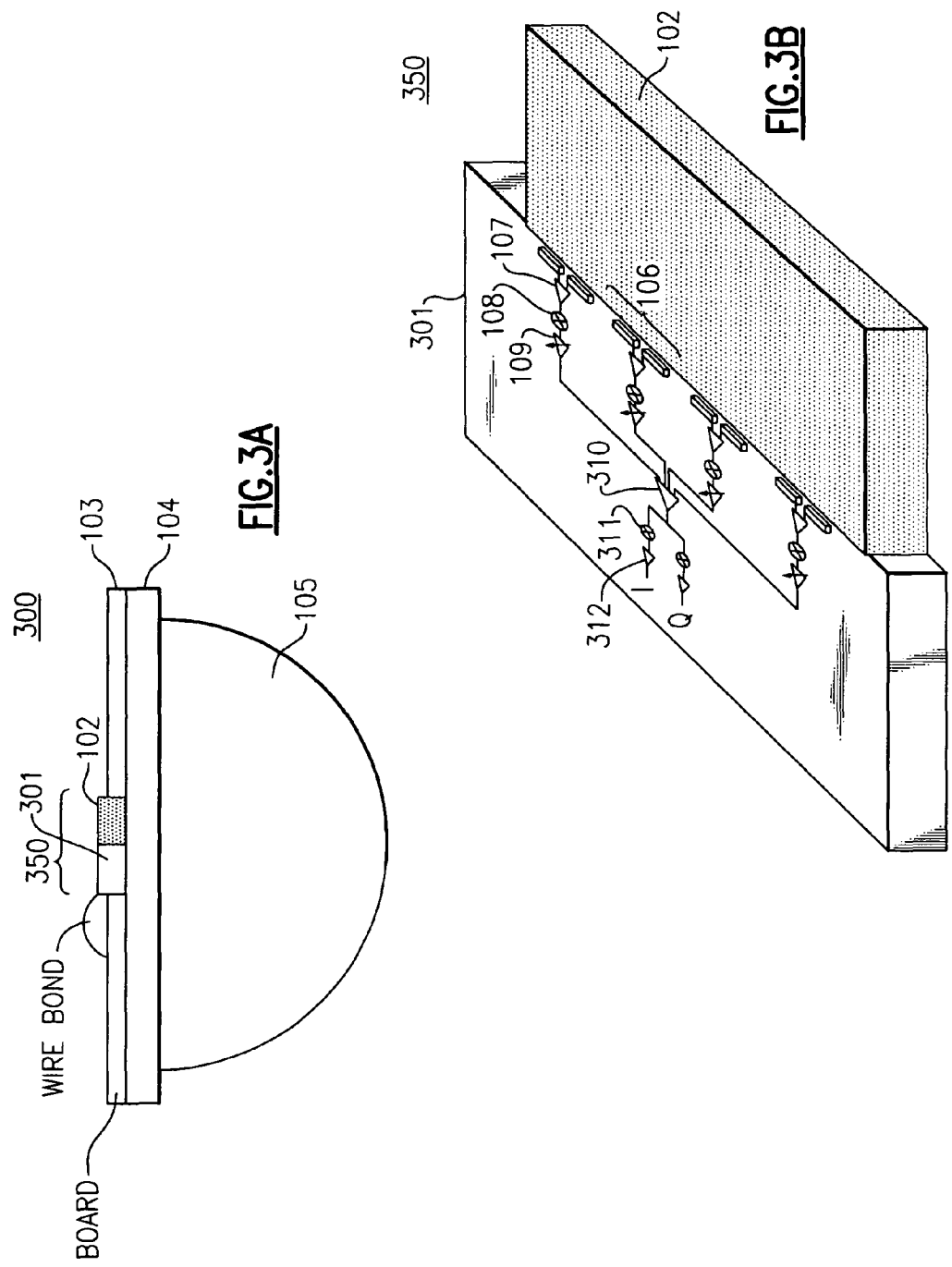

| W-BAND RECEIVER PERFORMANCE SUMMARY | |
|---|---|
| GAIN (SINGLE PATH) | 41 dB |
| NOISE FIGURE | 8dB |
| INPUT-REFERRED 1-dB COMPRESSION POINT | -44dBm(RECEIVER), -34dBm(LNA) |
| CURRENT CONSUMPTION (SINGLE-PATH) | 60mA(RECEIVER), 20mA(LNA) |
| INFERRED ARRAY GAIN | 53 dB |
| INFERRED SNR IMPROVEMENT | 6 dB |
| SUPPLY VOLTAGE | 2.5V(RECEIVER EXCLUDING LNA) 3.5V(LNA) |
| RECEIVER DIE AREA | 9.0 mm$^2$ |

ON-CHIP BALUN 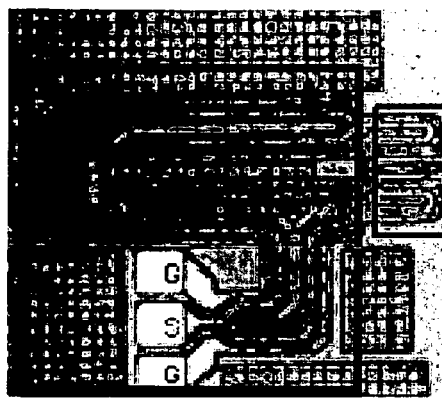 77GHz LNA 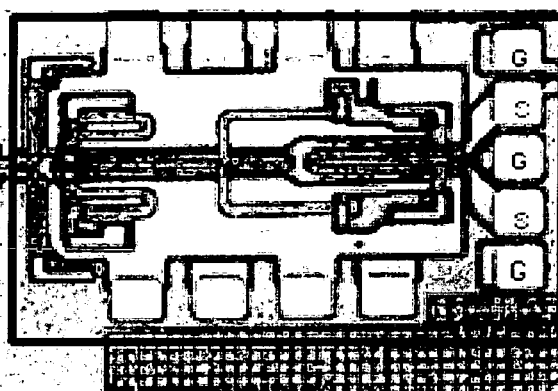
BALUN #1 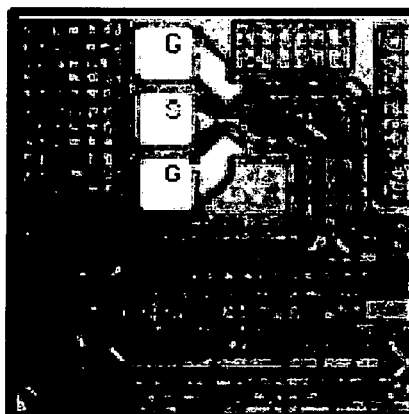 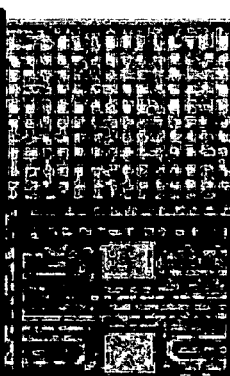 BALUN #2 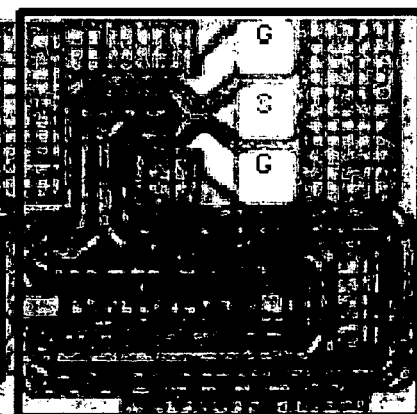
λ/4 MATCHING T-LINES
FIG.17C

| | |
|---|---|
| RECEIVER CONVERSION GAIN | +37dB (PER ELEMENT) |
| INFERRED ARRAY GAIN | +49dB |
| RECEIVER 3dB-BANDWIDTH | 2GHz |
| RECEIVER MINIMUM NF | 8dB (PER ELEMENT) |
| LNA GAIN | +23dB |
| LNA 3dB-BANDWIDTH | 6GHz |
| LNA MINIMUM NF | 5.7dB |
| LNA OUTPUT REFERRED 1dB | −5.5dBm |
| ANTENNA GAIN | +2dBi |
| CURRENT CONSUMPTION: | |
| EACH LNA (@3.5V) | 17.5mA |
| EACH DOWN-CONVERSION PATH (@2.5V) | 40mA |
| ENTIRE 4-PATH RECEIVER WITH FREQUENCY SYNTHESIZER (@2.5V) | 420mA |

| | |
|---|---|
| TRANSMITTER PERFORMANCE | |
| MAXIMUM OUTPUT POWER | +10.1dBm |
| 4-ELEMENT EIRP | +22.1dBm |
| TRANSMIT 3dB-BANDWIDTH | 2.2GHz |
| GAIN | 34dB (SINGLE ELEMENT) |
| OUTPUT REFERRED 1dB COMPRESSION POINT | +7.8dBm |
| IMAGE SIGNAL ATTENUATION | >20dBc (FOR FIRST UPCONVERSION STEP) |
| | >30dBc (FOR SECOND UPCONVERSION STEP) |
| LO LEAKAGE POWER | <-19dBc |
| TRANSMITTER POWER CONSUMPTION | |
| SIGNAL PATH @ 77GHz | |
| PA AND PA DRIVER (@1.5V) | 265mA (PER ELEMENT) |
| RF MIXER AND BUFFER (@2.5V) | 18mA (PER ELEMENT) |
| DISTRIBUTION BUFFERS AND BASEBAND MIXERS (@2.5V) | 46mA |
| PHASED ARRAY PERFORMANCE | |
| PEAK-TO-NULL RATIO (2-ELEMENT LOOPBACK) | >12dB |
| BEAM-STEERING RESOLUTION | CONTINUOUS (LIMITED BY DAC RESOLUTION IN PRACTICE) |
| VCO TUNING RANGE | 50.35GHz TO 55.49GHz (9.6%) |
| DIVIDER LOCKING RANGE | 51.4GHz TO 54.5GHz (5.9%) |
| LO-PATH POWER CONSUMPTION | |
| VCO AND BUFFERS (@2.5V) | 10mA |
| ANALOG DIVIDER CORE (@2.5V) | 3.1mA |
| DIVIDER BUFFERS | 28mA |
| LO PATH DISTRIBUTION BUFFERS (@2.5V) | 12mA (EACH DISTRIBUTION BUFFER) |
| PHASE ROTATORS (@2.5V) | 14mA (EACH PHASE ROTATOR) |
| DIE SIZE | 17mm² |
| DEVICE TECHNOLOGY | 0.12μm SiGe BiCMOS |

*FIG.23*

MM-WAVE FULLY INTEGRATED PHASED ARRAY RECEIVER AND TRANSMITTER WITH ON-CHIP ANTENNAS

CROSS-REFERENCE TO RELATED APPLICATIONS

This application claims the benefit and priority of U.S. Provisional Application Ser. No. 60/720,228, "A mm-Wave Fully Integrated Phased Array Receiver Transmitter with on Chip Antennas: Receiver with on Chip Antennas", filed Sep. 23, 2005. The 60/720,228 provisional application is hereby incorporated by reference in its entirety. Other aspects of the instant invention are discussed in U.S. patent application Ser. No. 10/988,199, "Monolithic Silicon-Based Phased Arrays for Communications and Radars", filed Nov. 12, 2004. The Ser. No. 10/988,199 application, now U.S. Pat. No. 7,502,631 issued Mar. 10, 2009, is hereby incorporated by reference in its entirety.

FIELD OF THE INVENTION

The invention relates to mm-wave receivers and transmitters in general and particularly to an integrated mm-wave device that employs a phased array.

BACKGROUND OF THE INVENTION

Semiconductor integrated circuit (IC) density and maximum frequency of operation increases every year. In recent years, the operating frequency of commercial communications and radar applications has also increased towards the upper end of the radio frequency spectrum, including operation at mm wavelengths. With the silicon chip assuming greater functionality at higher frequencies in a smaller area at a lower cost, it is becoming economically feasible to manufacture high-frequency wideband ICs for both commercial and consumer electronic applications. High-frequency wideband IC applications now include millimeter (mm) wave applications such as short range communications at 24 GHz and 60 GHz and automotive radar at 24 GHz and 77 GHz.

Several frequency bands in the millimeter wave range have been approved by the Federal Communications Commission (FCC) for wireless communications and automotive radar. These include the 24.05~24.25 GHz and 57~64 GHz bands for high speed wireless communications, and the 22~29 GHz and 76~77 GHz bands for automotive radar. The 76~77 GHz band has also been allocated for use in automotive radar in many other countries around the world. The Electronic Communications Committee (ECC) within the European Conference of Postal and Telecommunications Administrations has allocated the 77~81 GHz window for automotive ultra wide band (UWB) short-range radar. Although current industrial efforts in the 77 GHz range are focused on automotive radar, millimeter wave wireless systems can also be used for other applications, such as short-range surveillance, microwave imaging and ultra high-speed data transmission.

Mm-wave communication and radar applications are generally designed to have both high power output and a directional antenna to compensate for relatively high signal propagation losses in air. Phased array antennas can provide a robust solution to the challenges of high frequency (mm wavelength) power generation by increasing the effective isotropic radiated power (EIRP) due to their array gain, beamforming, and electronic beam-steering properties. "A Fully Integrated 24-GHz Eight-Element Phased-Array Receiver in Silicon", Xiang Guan, et. al., IEEE Journal of Solid-State Circuits, Vol. 39, No. 12, December, 2004, by two of the present inventors describes one such integrated solution using phased arrays.

A number of problems have been observed in high frequency mm-wave integrated applications. Coupling power output from an integrated mm-wave transmitter to an off chip radiating device, such as an off chip antenna, or directly from an integrated circuit emitter to propagation in air is particularly problematic. Losses related to such off chip coupling can include substrate dielectric loss, substrate conductive losses, voltage induced breakdowns, poor metal conduction to the chip, and unwanted signal radiation at the chip RF interface. Similar losses, with the exception of voltage induced breakdowns, are problematic when coupling mm-wave signals from the air to the input stages of an integrated mm-wave transceiver.

Another problem involves testing mm-wave integrated devices. High cost test setups, such as bench instrumentation found in R&D laboratories or automatic test equipment (ATE) as found at production facilities are generally not available for field use. It is often difficult to properly test and evaluate the performance of most integrated mm-wave applications in the field.

Therefore, there is a need for signal radiating solutions for integrated mm-wave applications that do not require high frequency off chip RF connections. There is also a need for built in test and measurement capabilities in integrated RF systems that can fully characterize both receiver and transmitter performance, including one or more antenna systems.

SUMMARY OF THE INVENTION

In one aspect, the invention relates to a phased array mm-wave device including a substrate. The mm-wave device also includes at least a selected one of: a transmitter section comprising a mm-wave transmitter integrated onto said substrate, said transmitter configured to transmit a mm-wave signal; and a first phased array antenna system integrated onto said substrate, said first phased array antenna system electrically coupled to said mm-wave transmitter, said first phased array antenna system including two or more antenna elements; and a receiver section comprising: a mm-wave receiver integrated onto said substrate, said receiver configured to receive a mm-wave signal; and a second phased array antenna system integrated onto said substrate, said second array antenna system electrically coupled to said mm-wave receiver, said second phased array antenna system including two or more antenna elements. The mm-wave device also includes one or more dielectric lenses operatively coupled to at least a selected one of said first phased array antenna system and said second phased array antenna system to improve the transmission or the reception of mm-waves from or by the respective phased array antenna system; wherein all of the mm-wave circuitry is integrated onto said substrate, thereby eliminating a need to couple mm-wave signals off said substrate. In one embodiment, the two or more antenna elements are dipole antennas. In another embodiment, the one or more dielectric lenses is a single dielectric lens operatively coupled to the one or more antenna elements. In another embodiment, the one or more dielectric lenses include a plurality of dielectric lenses individually operatively coupled to at least one of the antenna elements. In another embodiment, the device is constructed as a flip chip and wherein the antennas and at least one dielectric lens are mounted in contact with the flip chip. In another embodiment, the device further includes a silicon wafer disposed between the substrate and the dielectric lens. In another embodiment, the dielectric lens is a shaped structure. In one embodiment, the shaped structure is a substantially spherical section. In another embodiment, the shaped structure is a substantially hemispheric shaped section. In one embodiment, the shaped structure is a substantially elliptical shaped structure. In another embodiment, the relative position of one or more antenna elements is at a positive or negative extension of one of the one or more dielectric lenses. In another embodiment, the one or more dielectric lenses include a silicon dielectric. In one embodiment, the one or more dielectric lenses include a ceramic dielectric. In another embodiment, the one or more dielectric lenses include a mechanically cut and polished dielectric lens. In another embodiment, the one or more dielectric lenses further comprise a layer of dielectric matching material. In another embodiment, the receiver and the transmitter each have a separate phased array antenna system on the substrate. In one embodiment, the receiver and the transmitter share a common phased array antenna system on the substrate. In another embodiment, the device is used for voice or data communications. In one embodiment, the voice or data communications is substantially in a 24 GHz or 60 GHz radio spectrum band. In another embodiment, the device is used for radar. In another embodiment, the radar is substantially operated in a 24 GHz or 77 GHz radio spectrum band. In one embodiment, the radar is used for automotive radar. In another embodiment, the receiver includes a distributed active phase combing circuit including a combining tree using differential routing transmission lines. In another embodiment, the receiver and transmitter comprise dual conversion circuit topologies and at least two oscillator frequencies wherein all of the oscillator signals are derived from a common oscillator situated on the receiver transmitter device. In another embodiment, the device is implemented in BiCMOS. In one embodiment, the device in implemented in CMOS. In another embodiment, the device in implemented in a silicon based technology. In another embodiment, the device further includes germanium.

In another aspect, the invention features a mm-wave distributed combining tree circuit including at least two pairs of differential tranconductors with regenerative degeneration to accept at least two differential input signals, each differential input signal including an input signal designated + and an input signal designated – of the differential input signal. At least two active combined output stages generate a differential output signal ("Vout") including a +Vout and a –Vout. Also, at least two pairs of isolating cascode stages, each cascode pair having a differential routing transmission line electrically coupled to one of the pairs of differential tranconductors and each cascode pair having a differential routing transmission line electrically coupled to the active combined output stages. A source of power provides power to the mm-wave binary combining circuit. In one embodiment, the combining tree circuit further comprising two additional pairs of differential tranconductors and two additional pairs of isolating cascode stages, the additional pairs to accommodate two additional differential input signals, thereby providing inputs for a total of four input differential signals, wherein the signal phase and signal amplitude integrity of the two additional differential input signals and the combined signals are substantially maintained when the two additional pairs of differential tranconductors are physically located more than several wavelengths from the at least two differential inputs. In another embodiment, each active combined output stage includes at least two transistors and the impedance of each differential transmission line is matched to a 1/gm of each corresponding transistor of each active combined output stage. In another embodiment, the differential transmission line is a differential microstrip "T" transmission line.

In another aspect, the invention features a mm-wave loop-back method including the steps of: providing an integrated receiver transmitter system on a substrate including an integral phased array antenna system; coupling a transmitter signal from a transmitter output to a receiver input; and measuring the phased array antenna patterns by varying a baseband input to the transmitter and observing a baseband receiver output.

In another aspect, the invention features a mm-wave loop-back method comprising the steps of: providing an integrated receiver transmitter system on a substrate including an integral phased array antenna system; coupling a transmitter signal from a transmitter output to a receiver input; and testing the integrated receiver transmitter system on a substrate by varying a baseband input to the transmitter and observing a baseband receiver output.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 2A shows suitable relative locations on the micrograph of FIG. 1C for antennas on layers not visible;

FIG. 3A illustrates exemplary embodiments of a cut away side view of an integrated receiver;

FIG. 3B shows an exploded perspective view of part of the receiver of FIG. 3A;

FIG. 17C shows micrographs of an on-chip balun;

FIG. 23 shows a table of transmitter test performance;

DETAILED DESCRIPTION OF THE INVENTION

DEFINITIONS: A mm-wave device according to the invention is described in at least three main embodiments: (1) as an integrated mm-wave receiver device, (2) as an integrated mm-wave transmitter device, and (3) as an integrated mm-wave receiver-transmitter (transceiver) device. Embodiments 1 through 3, and various embodiments thereof, are referred to broadly and interchangeably herein as having "at least a selected one of said receiver section and said transmitter section". The term "high frequency" as used herein refers generally to mm-wavelengths in or near the 24 GHz or 77 GHz radio bands, and not generally as has been used by others in past art as referring to "high frequency" or "HF" as has previously been defined in some of the radio communications arts as from about 3 MHz to about 30 MHz. It should also be noted that the term "compression" as used herein refers to saturation effects in amplifiers.

Figure 1A:
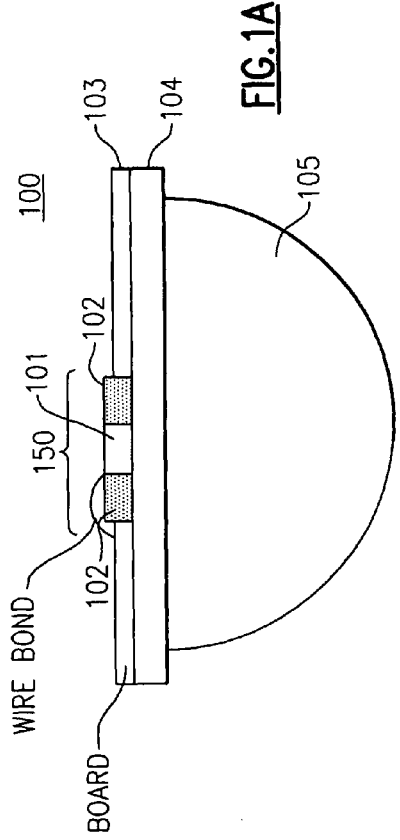
FIG. 1A illustrates exemplary embodiments of a cut away side view of a receiver-transmitter according to the invention.
Figure 1B:
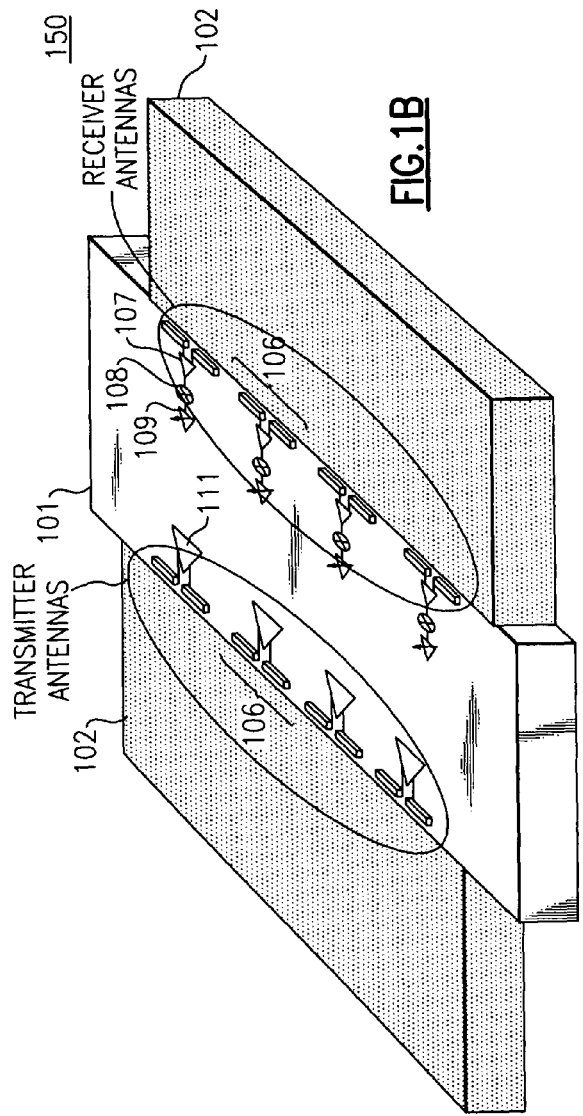
FIG. 1B shows an exploded perspective view of part of the receiver-transmitter of the receiver-transmitter of FIG. 1A.
Figure 1C:
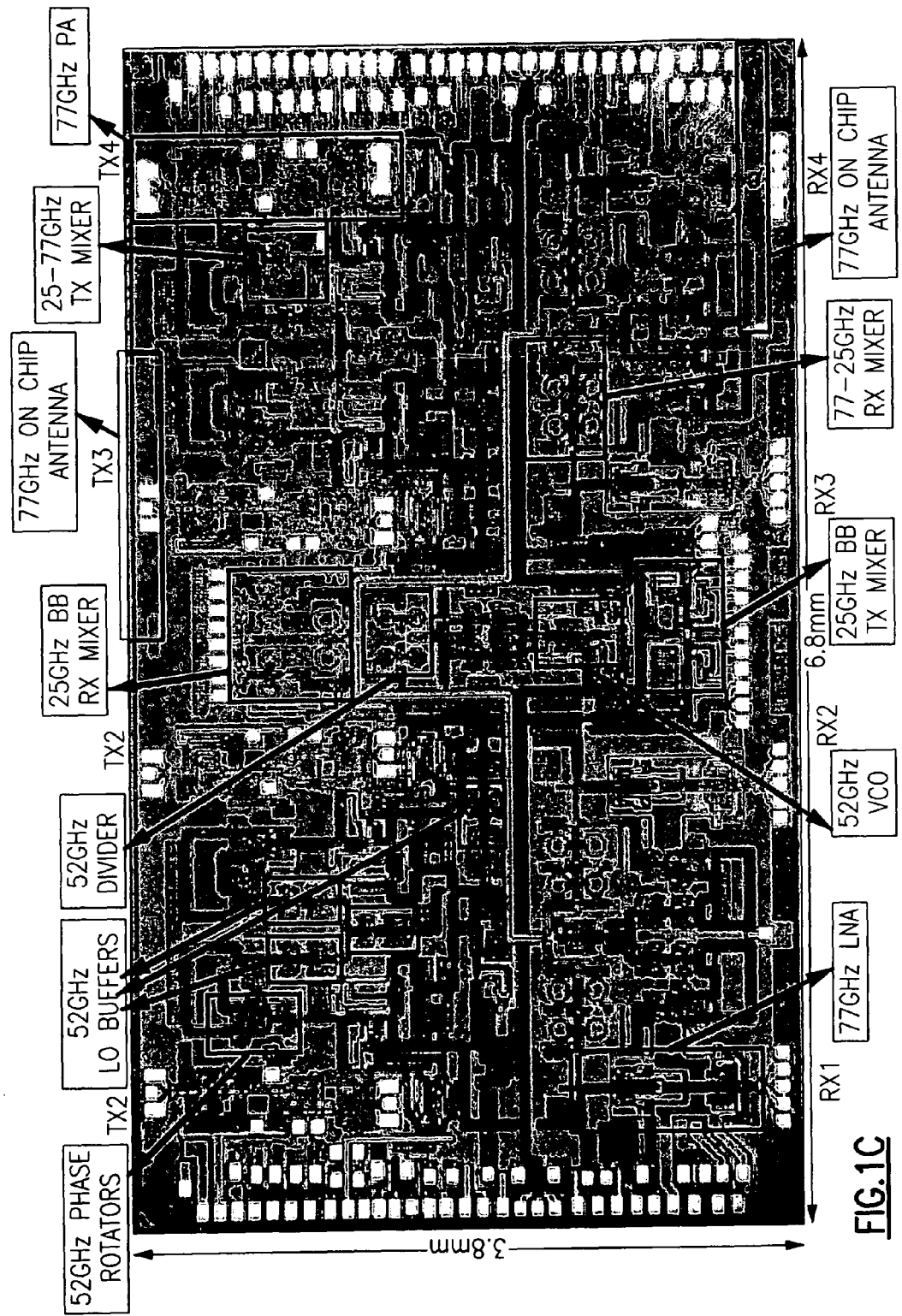
FIG. 1C shows a micrograph of a combined receiver-transmitter integrated circuit according to the invention.
Figure 2B:
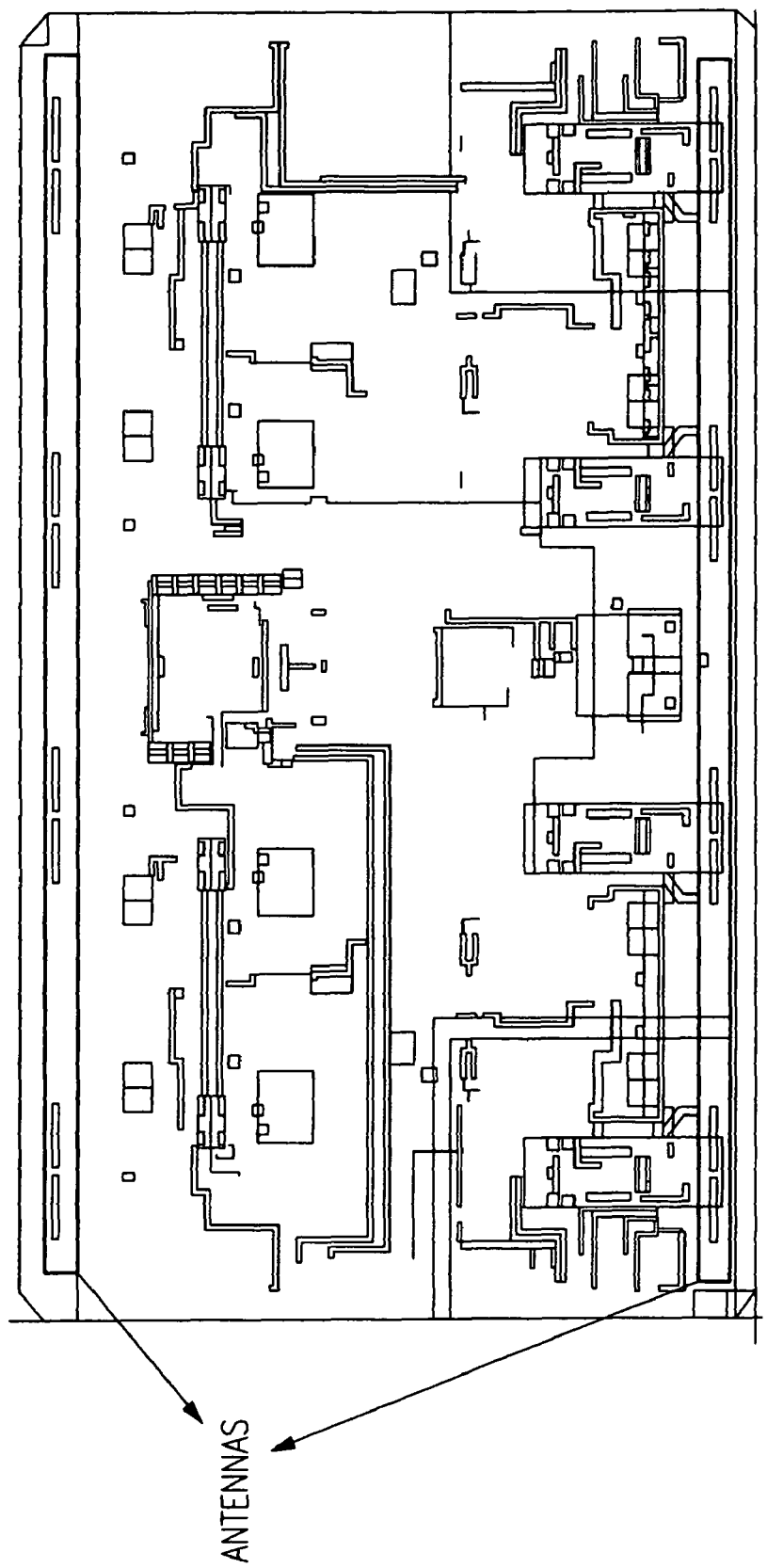
FIG. 2B shows exemplary dipole antennas on an intermediate metallization layer of the chip shown in FIG. 2A.

FIG. 1A shows a cut away side view of one embodiment of a fully integrated mm-wave receiver-transmitter (transceiver) 100 according to the invention. Receiver-Transmitter (transceiver) chip 101 is shown situated between two undoped silicon slabs 102 partially supported by board 103 and mounted on a first side of an undoped silicon wafer 104. Dielectric lens 105, a silicon lens in this exemplary embodiment, is shown affixed to a second side of undoped silicon wafer 104. An exploded perspective view of a partial assembly 150 including transceiver chip 101 having two undoped silicon slabs 102 on either side, is shown in FIG. 1B. In this embodiment there are separate phased array antenna systems for the receiver and for the transmitter of transceiver 101, each exemplary phased antenna system including four dipole antennas 106. A portion of the receiver are shown in block form, including low noise amplifier (LNA) 107, mixer 108, and intermediate frequency (IF) amplifier 109. On the transmitter side, a final power amplifier (PA) 111 is shown for each transmit dipole antenna 106. An exemplary micrograph of a fully integrated mm-wave receiver-transmitter (transceiver) 100 according to the invention is shown in FIG. 1C. Antennas 106 can be formed on a metallization layer. FIG. 2A shows the approximate location of antennas 106 on the micrograph of FIG. 1C. FIG. 2B shows a corresponding metallization layer where the antennas have been deposited.

Returning to the embodiment shown in FIG. 1A and FIG. 1B, most of the energy from transmit antennas 106 is first absorbed into un-doped silicon wafer 104 having substantially the same dielectric constant as transceiver silicon chip 101. Un-doped silicon slab 102 can also have substantially the same dielectric constant as un-doped silicon wafer 104. Un-doped silicon wafer 104 can also have substantially the same dielectric constant as un-doped silicon slab 102. Silicon lens 105 can also have substantially the same dielectric constant as un-doped silicon wafer 104. Therefore from an electromagnetic (EM) perspective, the entire silicon assembly can be considered to be effectively part of the silicon lens EM radiator unit since all of the elements 101, 102, 104, and 105 have substantially the same dielectric constant.

Lens 105 can be a section of mechanically cut and polished silicon. As shown in FIG. 1A, lens 105 can typically be a single relatively large hemispherical section formed over the entire assembly 150 to create a uniform pattern for all of the antennas on transceiver 101. For example, lens 105 can have a diameter of about one inch at 77 GHz where one wavelength in the silicon is about 1.14 mm (in the air the corresponding wavelength is about 3.9 mm). A slightly smaller single lens can be more efficient (less energy loss), but still larger than the antennas. Or, there could be individually shaped lens elements over each of the antennas 106 (micro lenses), or some other combination of antennas 106. A micro lens can be created behind each antenna 106, either by thinning the chip and mounting a prefabricated dielectric lens, or by etching the adjacent side of the chip in the shape of a lens. Lens 105 can be fabricated from any material that has a dielectric constant similar to silicon. Some types of materials with the appropriate dielectric constant can be easier to machine and/or of lower cost than silicon lenses. Exemplary materials suitable for use as lens 105 include ECCOSTOCK HiK 12 (a low loss plastic stock) or ECCOSTOCK CK 12 (a molded product) manufactured by Emerson & Cuming Microwave Products, Inc. of Randolph, Mass. Other ceramic materials having a dielectric constant similar to silicon can also be used.

Other lens shapes can be used for different radiating patterns including hemispheric and spherical shapes. The location of the plane of the antennas with respect to the geometric center of the lens, which we refer to as the "extension length" (location with respect to a geometric center) can be a positive extension or a negative extension.

It is further contemplated that a layer of matching material can be applied to or otherwise affixed to the radiating surface of lens 105. As in optics, and roughly analogous to an anti reflection (AR) coating, in one embodiment a matching layer can have a dielectric index of the geometric mean of the dielectric index of silicon and the dielectric index of the media to which the signals are being radiated into, typically air. It is further contemplated that there could be multiple matching layers, each having a dielectric index calculated to provide a smoother transition from the dielectric index of air to the dielectric index of silicon.

It should also be noted that in an embodiment where the integrated transceiver is flip chip bonded, support layer 104 is not needed. In this case lens 105 can be mounted in contact with the flip chip.

While several embodiments built to date have used separate receiver and transmitter phased array antenna systems, it is contemplated that the transmitter and receiver could share one common antenna system. One way to implement a single antenna system on a fully integrated mm-wave receiver-transmitter 100 would be by use of RF switches to permit electronic switching of the antenna back and forth between the transmitter and the receiver as needed.

It is also noted that a phased array antenna system can have varying numbers of elements. An embodiment having as few as two antenna elements, such as two dipole antennas 106, can be used to provide a phased array effect, albeit with less directivity. In alternative embodiments, more than four elements can be used for higher directivity as in creating a finer beamwidth or narrower aperture pattern.

Further, where two separate antenna systems are used, it is contemplated, particularly in communications applications, that a full duplex mode could be possible using proper isolation between a receive antenna system and a transmit antenna system, whereby there could be transmission during reception. Such isolation between a transmit antenna array and receive antenna array could be accomplished by incorporating the antennas on different layers or on different sides of the integrated receiver-transmitter device.

It should also be noted that transceiver 100 can be implemented in BiCMOS, or CMOS. Suitable fabrication technologies include silicon and silicon germanium based fabrication processes.

A fully integrated mm-wave receiver-transmitter (transceiver) 100 according to the invention can be used for both commercial and consumer electronic applications including mm-wave applications such as communications applications at 24 GHz and 60 GHz and automotive radar at 24 GHz and 77 GHz. Receiver-transmitter 100 can also be used for other applications, including short-range surveillance, microwave imaging and ultra high-speed data transmission. In such applications, receiver-transmitter 100 can be responsive to user requests that can control receiver-transmitter 100 operation, including receive-transmit cycle times and electronic antenna pointing, such as by user commanded control of an integrated phased array antenna system. It is also understood that data can be acquired from a receiver-transmitter 100 and communicated off chip for display in some meaningful way (e.g. for radar applications). Data can also be further processed onboard a fully integrated mm-wave receiver-transmitter 100 (e.g. for radar and/or communications applications). It is contemplated that additional onboard signal processing beyond what is described herein could be done "on chip" by further adding known signal processing circuitry on a fully integrated mm-wave receiver-transmitter (transceiver) 100.

The receiver and transmitter sections of the integrated mm-wave receiver-transmitter 100 are now described in more detail. While some of the components described below were fabricated and tested in stand alone configurations, i.e. as a standalone integrated receiver or as a standalone integrated transmitter, it is understood that these receivers and transmitters can also be included together on as single substrate as a fully integrated mm-wave receiver-transmitter 100 as described above and show in FIG. 1C.

Receiver Detailed Description

An exemplary 77 GHz 4-element phased array receiver 300 as shown in FIG. 3 includes on-chip dipole antennas 306 and is also suitable for use as a receiver in a mm-wave receiver-transmitter according to the invention. A fully-integrated 4-channel phased array receiver 300 with four integrated dipole antennas 106 also includes a complete RF signal path from 77 GHz down to baseband, and on-chip LO generation and distribution. Note that in the case of a combined receiver-transmitter, both the receiver and the transmitter can share one common LO generation block.

Beginning with the receive antennas 106, antenna integration removes the need for a tightly-controlled off-chip interface (e.g., wire bonds or flip chip), eliminating the last high frequency connections. Off-chip radiating elements suffer from additional interconnect losses and cannot duplicate the reproducibility of on-chip antennas due to the extremely tight dimension control necessary in the off-chip radiators and their high frequency connections to the chip. The small wavelength at mm-wave frequencies makes it possible to use on-chip metal layers to fabricate small integrated antennas. One important challenge for an on-chip antenna is the high dielectric constant of silicon ($\kappa$=11.7) which absorbs most of the radiated power into the substrate instead of radiating into space. For instance, a dipole antenna placed at the interface of two semi-infinite regions of silicon and air radiates less than 5% of the power into air and more than 95% couples into silicon.

Shielding the antenna from the substrate can decrease efficiency since in a typical silicon process, the small distance between the top and bottom metal layers corresponds to a small fraction of the wavelength in $SiO_2$ (roughly $0.01\lambda$ for 20 µm at 77 GHz). However, the first-resonance-mode radiation resistance of a dipole $0.01\lambda$ away from the ground layer is around 1$\Omega$. In addition to the practical problems in driving such a low-impedance load, any parasitic resistance in the antenna metal significantly lowers the efficiency (e.g., a factor of 2 for 1$\Omega$ ohmic loss).

We can exploit the inevitable energy coupling into the substrate by radiating from the backside of the chip. However, radiating from a planar backside suffers from energy coupling into substrate surface wave modes and is very inefficient. Fortunately as shown in FIG. 3, this problem can be overcome by mounting chip 301 on a hemispherical piece of dielectric, lens 305, with a similar dielectric constant as silicon to convert the surface modes into useful radiation power.

In this work, dipole antennas 106 are designed using the three bottom metal layers (each around 0.3 µm thick). This design combined with lens 105 on the backside substantially improves the gain and increases the radiation resistance of dipole antennas 306 to 45$\Omega$ at their first resonance mode. To minimize the impact of chip 301 substrate loss due its conductivity, all four receive antennas 106 are placed at the edge of the chip and a slab of undoped silicon 302 of the same thickness is placed flush with silicon chip 301, maintaining the same dielectric constant with a lower loss. Each antenna occupies less than 0.02 mm².

The entire 4-element phased-array receiver 300 can operate differentially to avoid common-mode EM and substrate coupling and common-mode oscillations. Each differential antenna drives a differential transmission line (t-line) which subsequently drives the input of one of the four on-chip LNAs 107.

Figure 4:
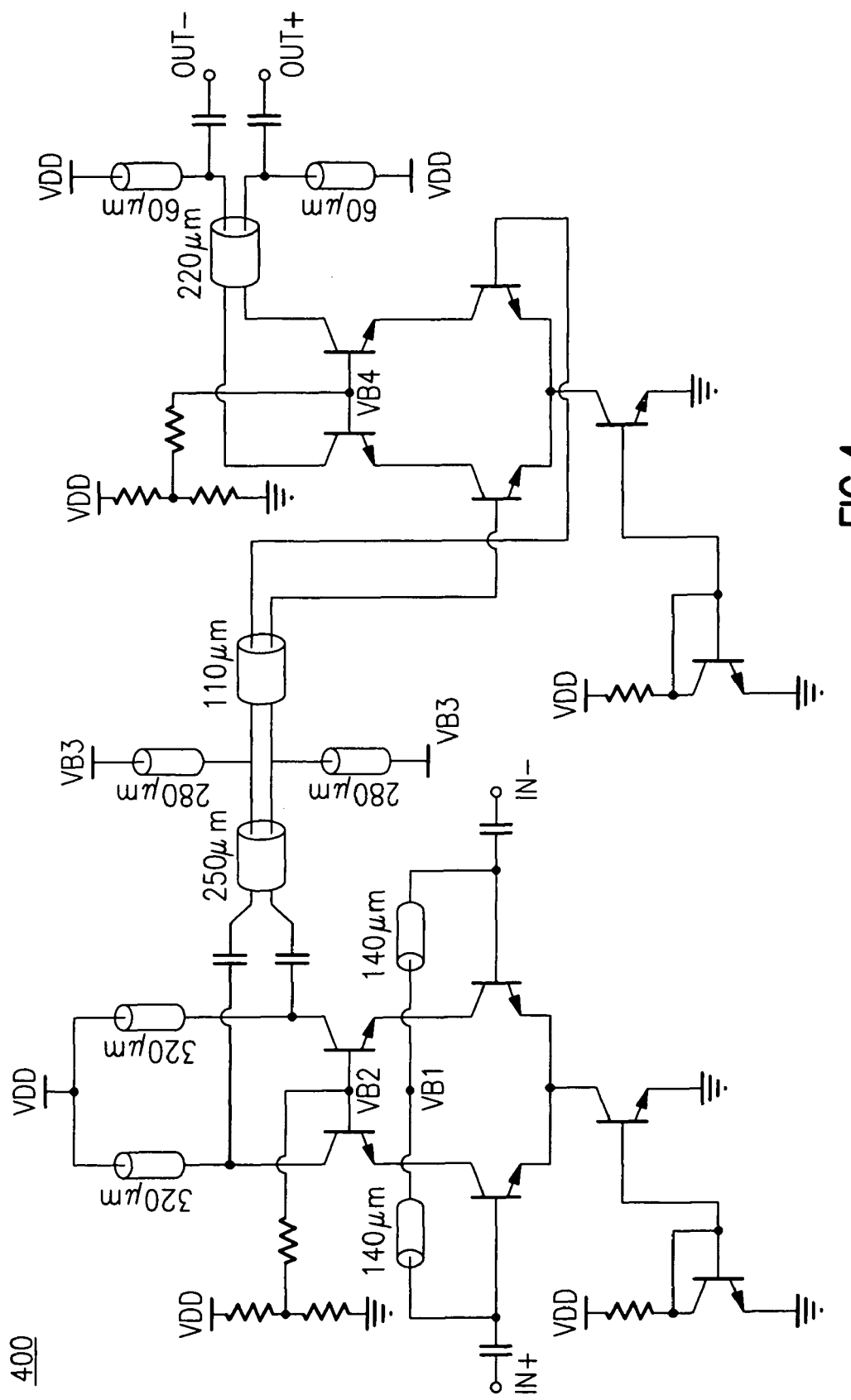
FIG. 4 shows a schematic diagram of an LNA.

Turning to FIG. 4, a two-stage differential cascode LNA 400 uses differential shunt and series t-lines for matching. To maintain a high CMRR at mm-wave frequencies a common-mode resistance is placed at the base of the cascode transistors, suppressing the common-mode gain by 20 dB.

Figure 5:
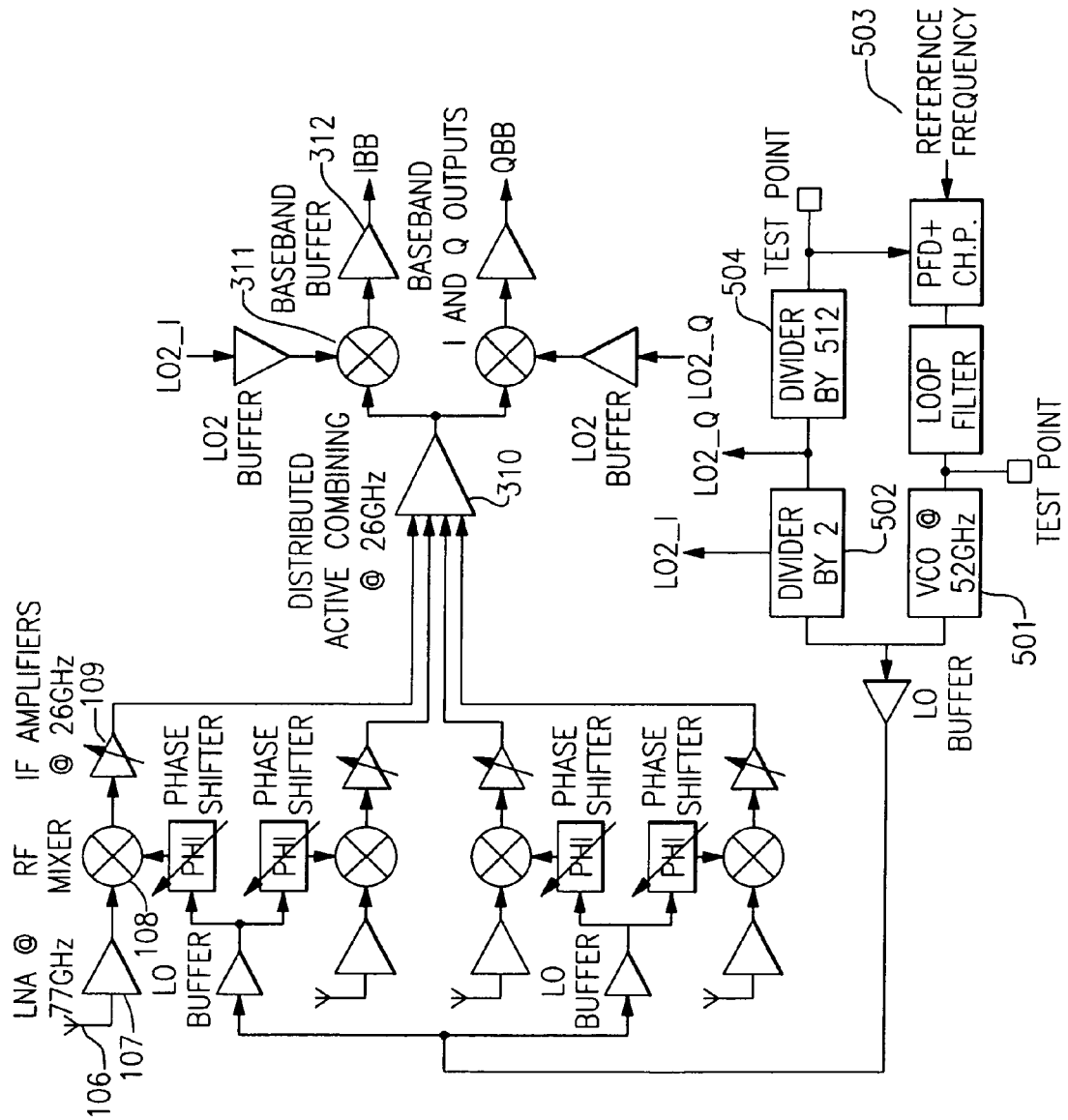
FIG. 5 shows a block diagram of an integrated receiver.

FIG. 5 shows the block diagram of the 77 GHz phased-array receiver section of the chip. It integrates the complete signal paths including four 77 GHz RF front-ends, distributed signal combining at IF, LO generation and distribution, and local phase rotators. Each RF front-end consists of an on-chip dipole antenna 106, an LNA 107, a mixer 108, and a variable gain IF amplifier 309. The phase shifting is performed at the LO port of each mixer 308. The 26 GHz IF signals are combined using a symmetric distributed signal combining amplifier 310. The combined signal is further down-converted using quadrature IF-to-baseband mixers 311. The first LO signal at 52 GHz is generated using VCO 501, which also generates the second LO via a quadrature divide by two 502. VCO 501 can be locked to an external low-frequency reference 503 using a frequency divider chain such as dividers 502 and 504.

Figure 6:
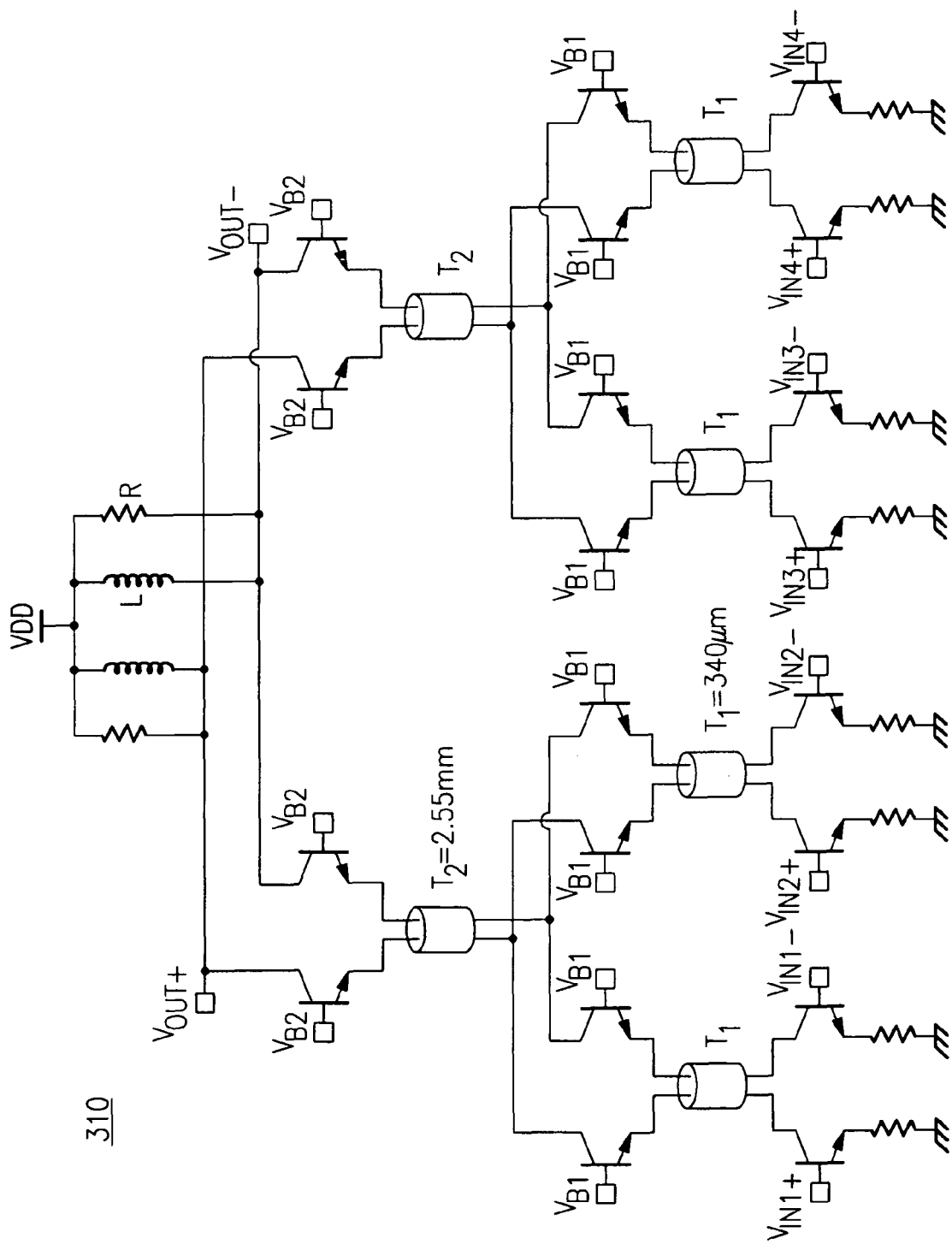
FIG. 6 shows a schematic diagram of a combing tree.

As shown in FIG. 6, the four IF signals can be combined through a distributed signal combining amplifier 310. The differential transconductors with resistive degeneration at the IF increase the dynamic range. The differential transconductor current outputs are symmetrically routed to the combining node via a two-stage binary structure. Common base transistors are used at each combining junction to isolate the input and output ports. The total length of the differential routing transmission lines $T_1$ is 340 μm and that of $T_2$ is 2.55 mm.

The 77 GHz phased array was designed and fabricated in a 120 nm SiGe BiCMOS process with the BJT $f_T$ of 200 GHz. The phased-array receiver can be implemented on the same die as a transmitter to create the inventive receiver-transmitter (transceiver) structure, and occupies an area of roughly 9 mm² of such a combined 6.8 mm×3.8 mm chip as shown in FIG. 2. The electrical performance of receiver 300 can be characterized by laser trimming the antennas and feeding the LNA inputs via waveguide probes.

Figure 7:
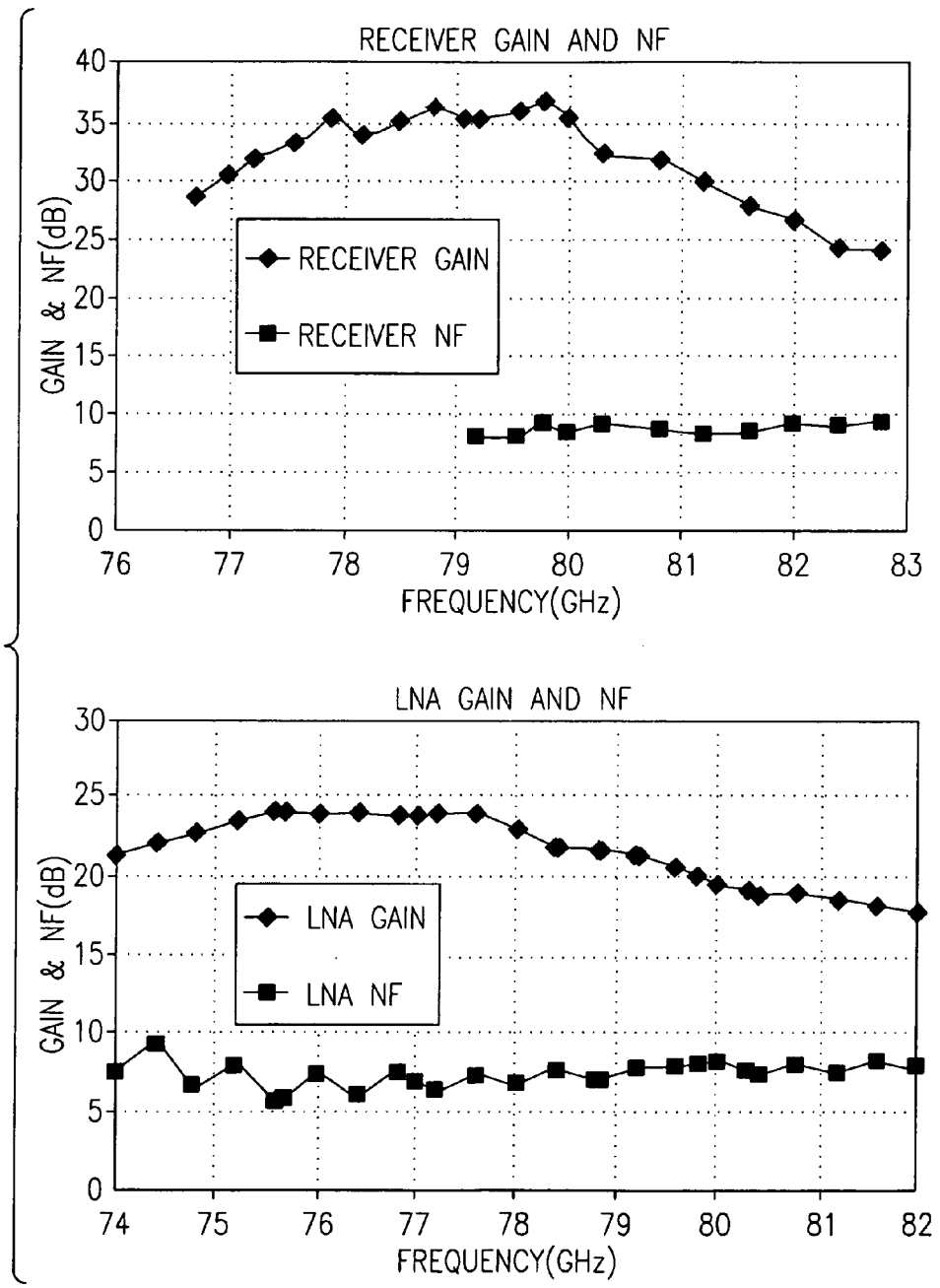
FIG. 7 shows graphs of gain and noise factor (NF) measurements.
Figures 8, 9:
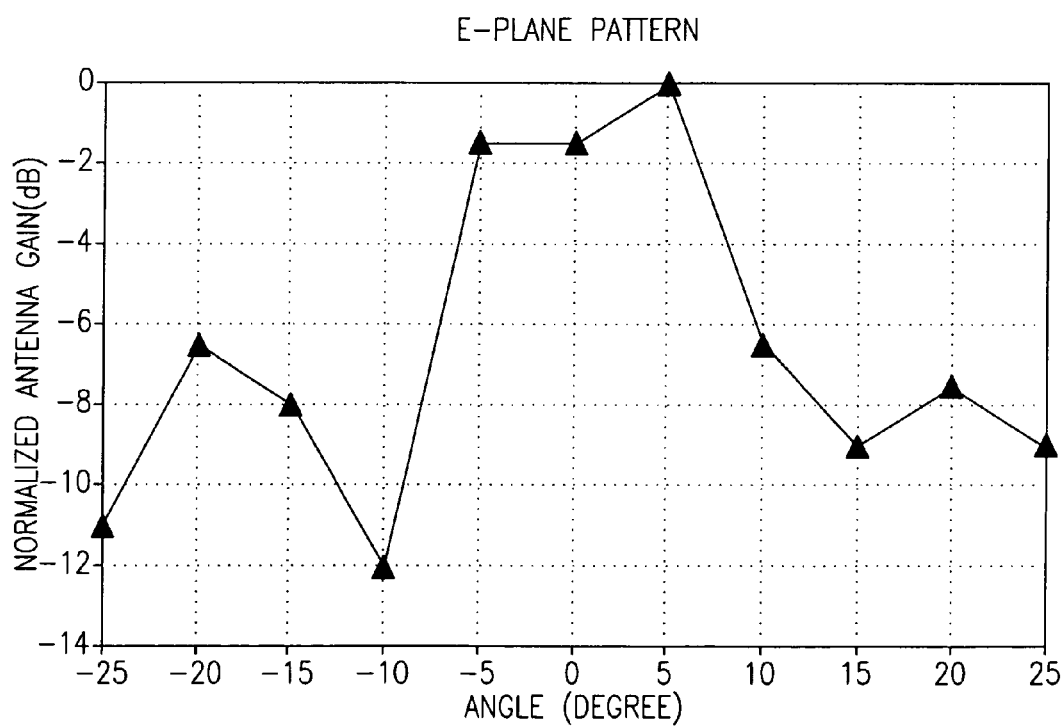
FIG. 8 shows a table of the performance of an integrated receiver.
FIG. 9 shows a graph of the normalized E-Plane pattern of a single on-chip dipole antenna.

A 37 dB single-path receiver gain was measured at 79.8 GHz with a 2 GHz bandwidth, corresponding to an inferred array gain of 49 dB. FIG. 7 shows the measured gain and NF of the complete receiver and the standalone LNA, which have minimum NFs of 8.0 dB (at 78.8 GHz) and 5.7 dB (at 75.7 GHz), respectively. The 4-element array can improve the SNR by up to 6 dB for uncorrelated antenna noise. LNA peak gain of 23.8 dB is measured at 77 GHz with a 3 dB bandwidth of more than 6 GHz. Each LNA consumes 17.5 mA and each downconversion path (excluding LNA) was found to dissipate 40 mA. The table of FIG. 8 summarizes the measurement results.

The radiation performance of the complete receiver 300 was measured using the setup of FIG. 3A and FIG. 3B where a PCB provides the power supply as well as low frequency and digital control signals to the chip and takes the baseband signal out using wirebond connections. A W-band standard horn antenna irradiates the receiver. The peak measured antenna gain was +2 dBi. This can be further improved by 4-5 dB using a smaller lens with the quarter-wavelength matching layer. FIG. 9 shows the measured E-plane single-chain receiver radiation pattern with and without the lens.

Example 1

Several sections of an exemplary mm-wave fully integrated phased array receiver with on-chip antenna are now explained in more detail.

I. Antenna Simulations and Measurement

Figure 11:
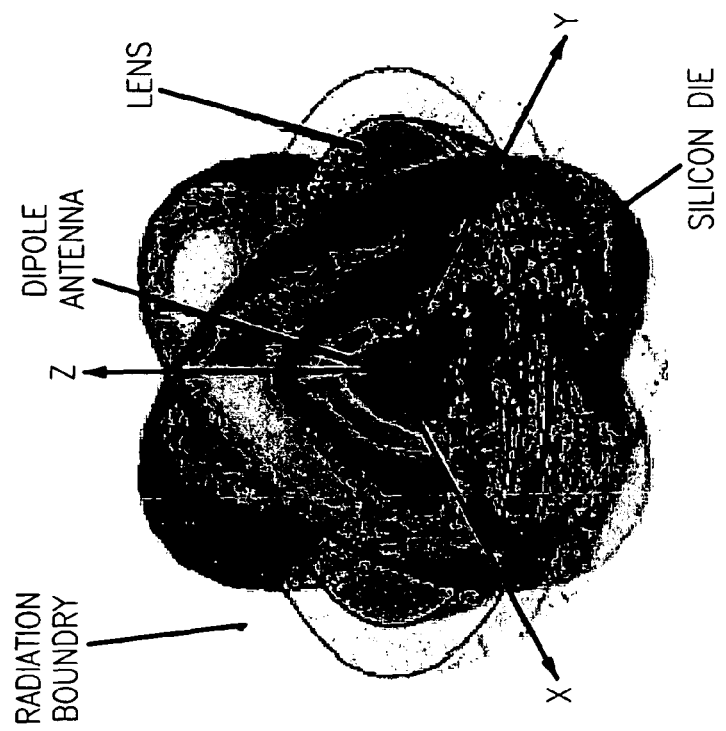
FIG. 11 shows a 3D field of a dipole antenna.
Figure 10:
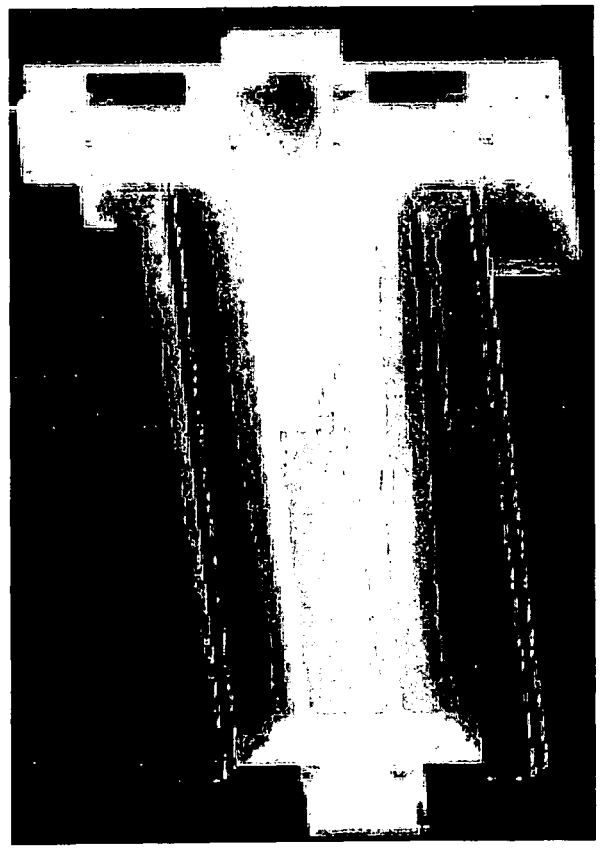
FIG. 10 shows a result of an IE3D T-line simulation.
Figure 12:
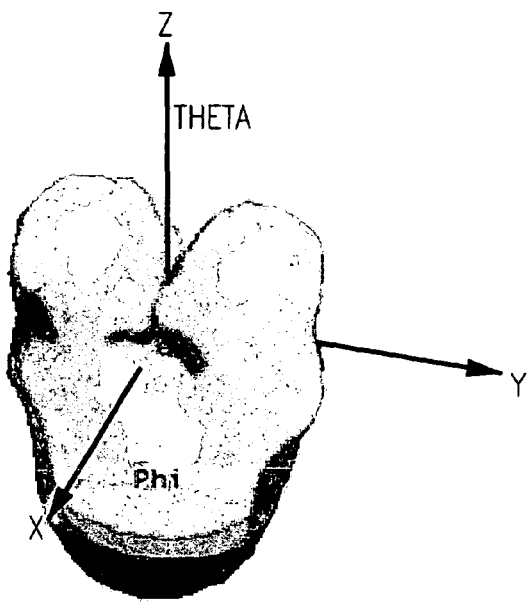
FIG. 12 shows a 3D pattern of a dipole antenna mounted on a silicon lens.
Figure 13:
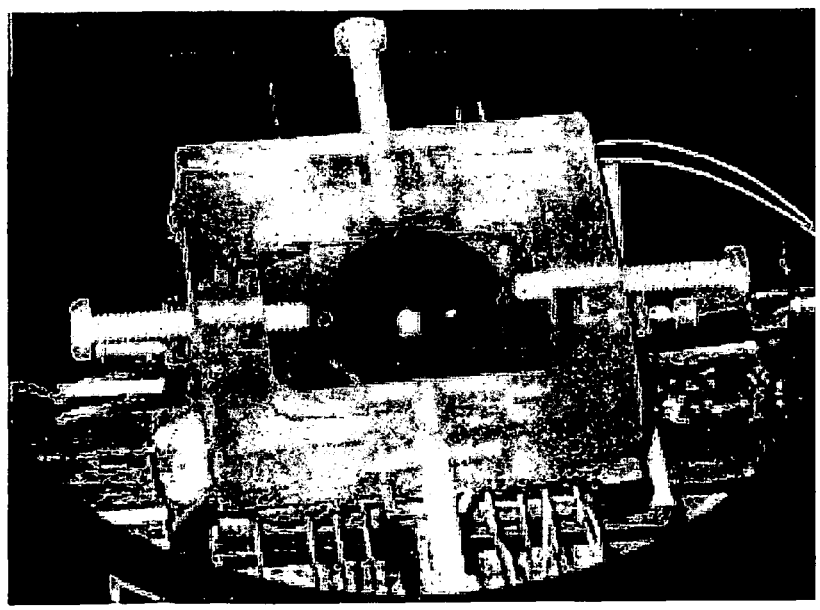
FIG. 13 shows a test setup having a single dielectric lens.
Figure 14:
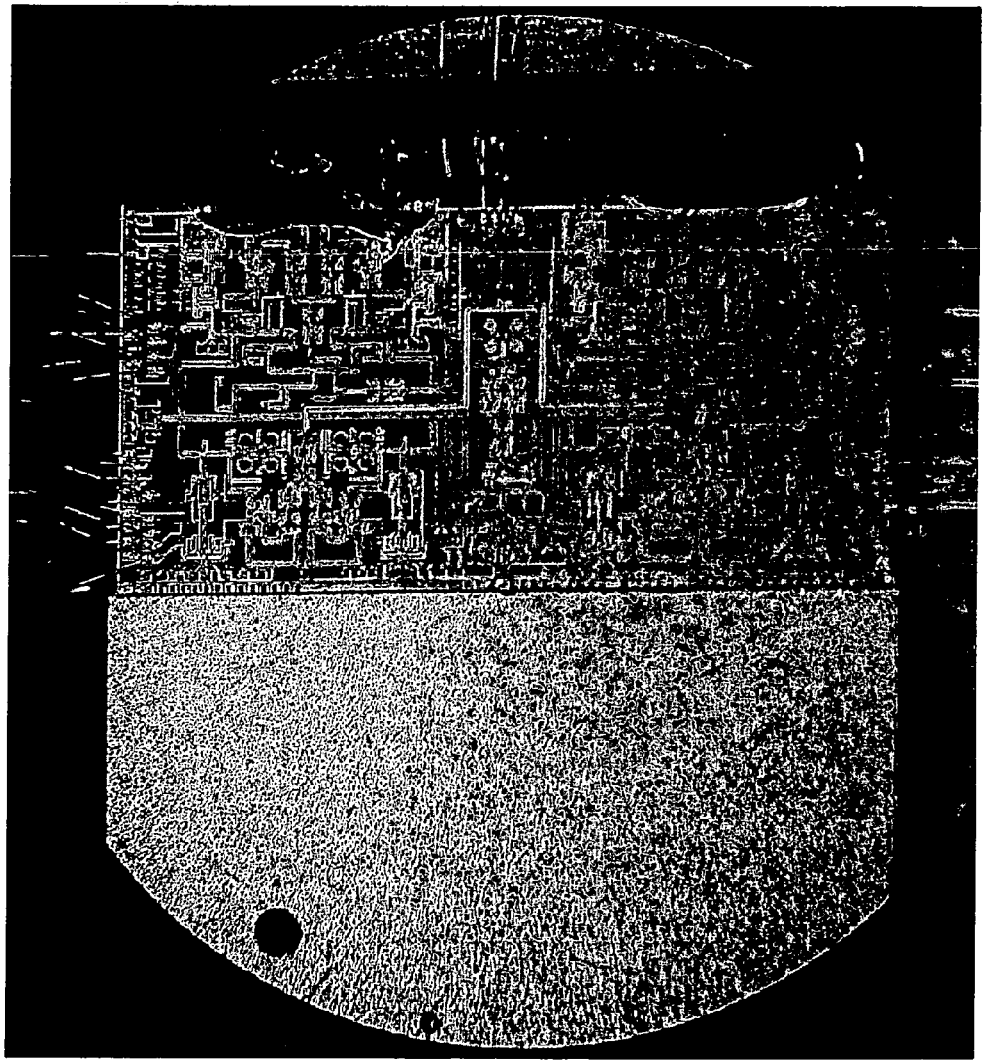
FIG. 14 shows another view of the lens setup of FIG. 13.

IE3D (a MoM-based electromagnetic simulator, available from Zeland Software, Inc., 48834 Kato Road, 103A, Fremont, Calif. 94538; see http://www.zeland.com) and HFSS (3D electromagnetic-field simulation software for high-performance electronic design, available from Ansoft Corporation, 225 West Station Square Drive, Suite 200, Pittsburgh, Pa. 15219; see http://www.ansoft.com/products/hf/hfss/) were used to simulate antenna pattern and impedance. The effects of reflection from chip edge, coupling between antenna and its feeding T-lines, metal filling and coupling between adjacent antennas were all simulated. IE3D was used to model the T-lines. FIG. 10 shows an IE3D prototype used to simulate one of the T-line structures of an LNA. The IE3D extracted S-parameters of T-lines can be used in ADS for circuit simulations. Using HFSS, a full 3D simulation as shown in FIG. 11 was also performed to analyze the effect of silicon lens. FIG. 12 shows a plot of the 3D antenna pattern which shows that most of the power gets coupled into the silicon. FIG. 13 and FIG. 14 show the test setup including a die and silicon lens.

II. 26 GHz Two-Mode Amplifier

Figure 15:
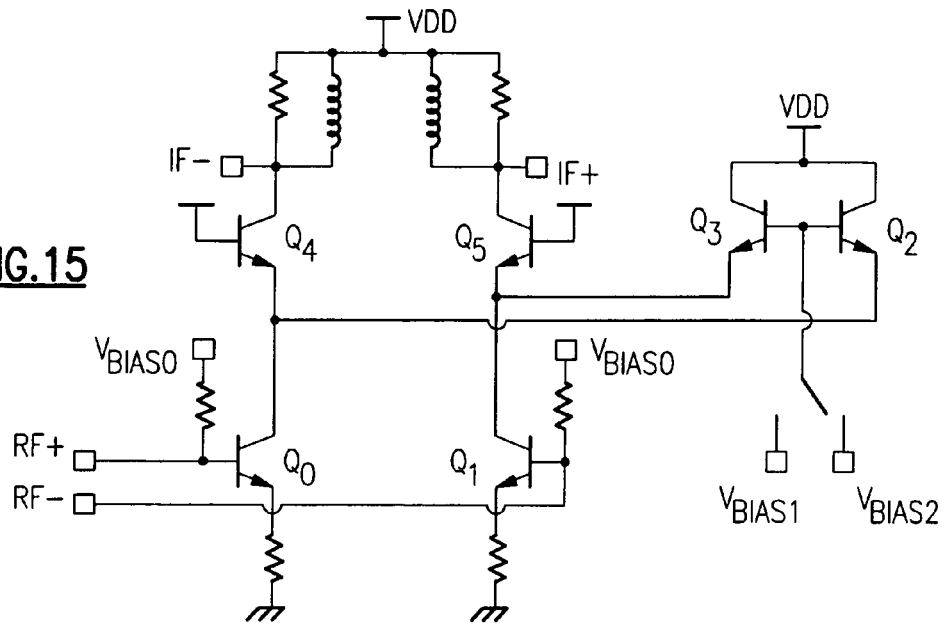
FIG. 15 shows a schematic diagram of a two-gain mode amplifier.

A differential resistively degenerated cascode was used as the 26 GHz amplifier, as shown in FIG. 15. A differential current-bleeding branch consisting of $Q_2$ and $Q_3$ was added. The dc bias voltage at the base of $Q_2$ and $Q_3$ can be toggled between two values by digital switches, corresponding to a high-gain and a low-gain mode of the amplifier. In high-gain mode, $Q_2$ and $Q_3$ are off. In low-gain mode, the gain normalized to its high gain value is approximately given by $$\frac{A_{v,low}}{A_{v,high}} = \left(1 + \frac{A_2}{A_4}\exp\left(\frac{V_{B,Q_2} - V_{dd}}{V_T}\right)\right)^{-1} \quad \text{Equation (1)}$$

where $A_2$, $A_4$ are the emitter area of $Q_2$ and $Q_4$ respectively. In this design, $V_{B,Q_2}$ at low-gain mode is set to $V_{dd}$, and $A_2/A_4$ is fixed at 11/3. Equation (1) predicts a 13.5 dB gain variation between the two modes. The simulation result shows a 15 dB gain variation. The 1.5 dB discrepancy is due to the loss through parasitic capacitance at the cascode node. It should be noted that a digital to analog converter (DAC) can also be used to set the bias voltage of $Q_2$ so that a variable gain 26 GHz amplifier with finer resolution can be implemented.

III. 26-GHz Quadrature Mixer and Baseband Buffer

Figure 16:
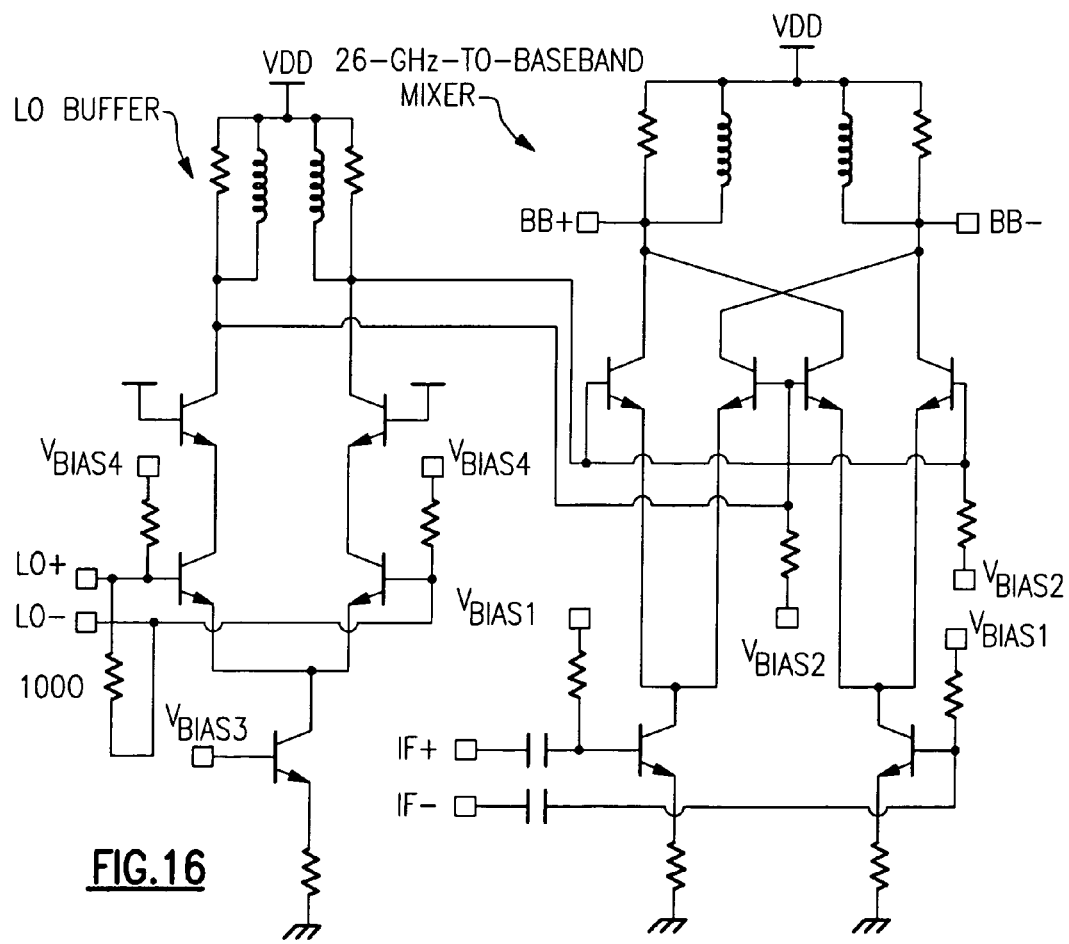
FIG. 16 shows a schematic diagram of a mixer and LO buffer.

A pair of double-balanced mixers driven by quadrature LO signals are used to perform frequency translation from 26 GHz to baseband, one of which is shown in FIG. 16. The 26 GHz signals are coupled into the mixer transconductance stage though 0.9 pF MIM capacitors. The input differential pair is degenerated with 30Ω resistors at the emitter to improve linearity.

The LO port of the mixer is fed by a 26 GHz buffer which is used to compensate the LO signal loss through the distribution network, ensuring the differential LO amplitude applied to the mixer is larger than 200 mV so that the mixer gain is saturated. The input matching of the LO buffer is provided by a 100Ω resistor directly connected between the differential inputs. Although a matching network composed of inductors and capacitors can provide additional voltage gain, this solution is less desirable because of limited silicon area. The LO buffer is loaded with 0.6 nH spiral inductors and 320Ω de-Q resistors, providing a gain of 15 dB. With a 280Ω load resistor, the second mixer achieves a 6 dB conversion gain and an 8-GHz IF-referred bandwidth. The mixer core consumes a current of 4 mA direct current (dc) and the LO buffer drains 1 mA. An emitter follower consuming 7 mA dc current is applied at each baseband output to drive 50Ω load.

IV. On-Chip Balun

Figure 17B:
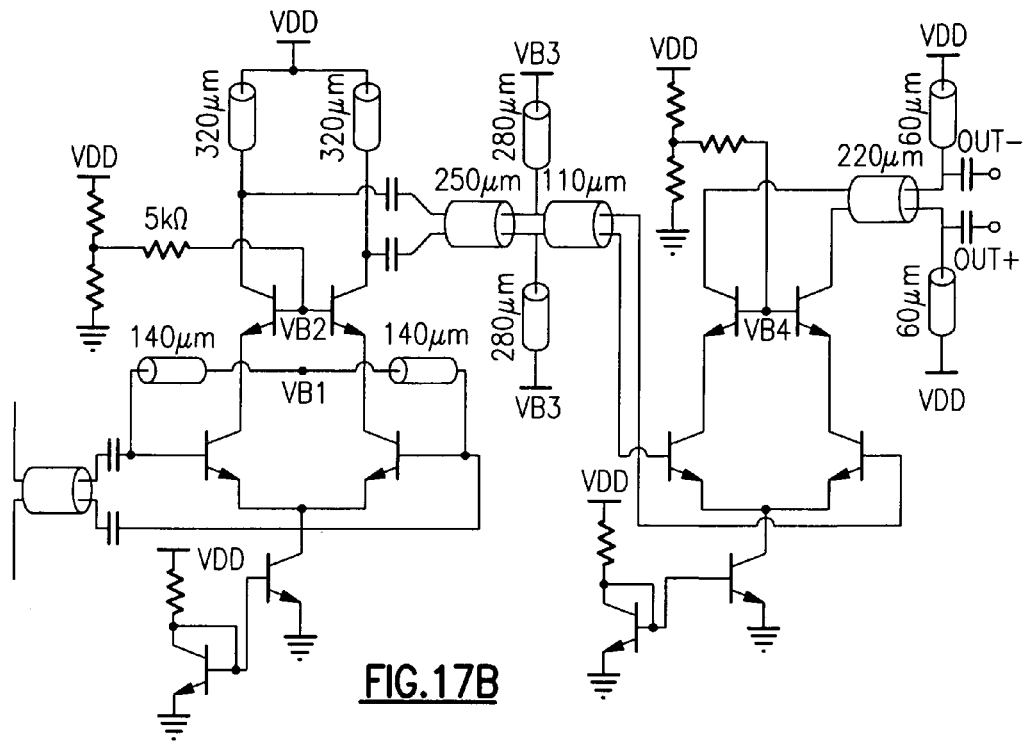
FIG. 17B shows a schematic diagram of an LNA.
Figure 17A:
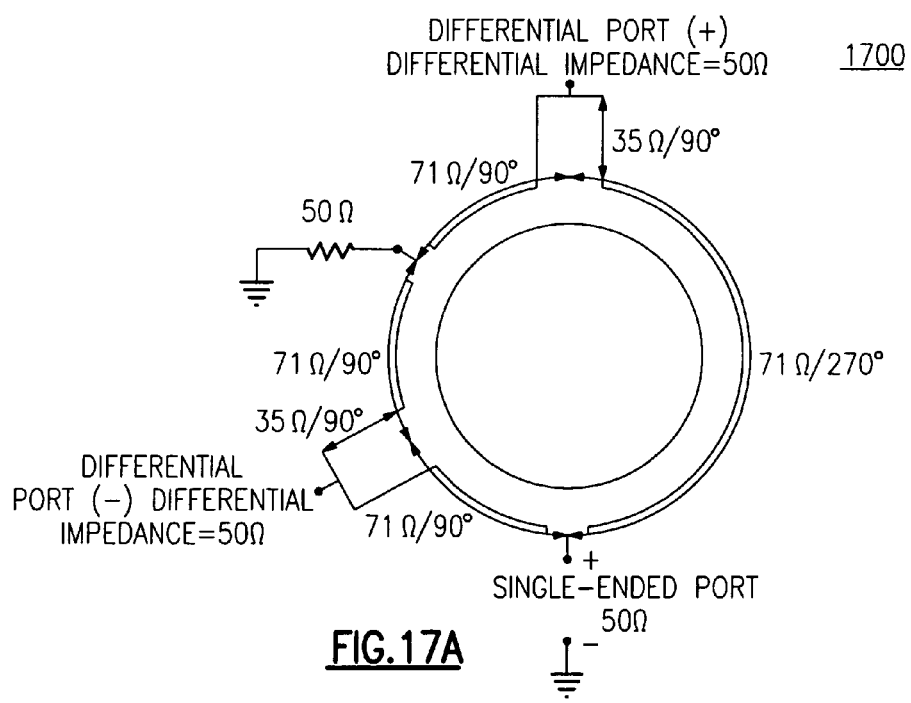
FIG. 17A shows diagram of a balun.

In order to characterize LNA performance independently, a single-ended to differential converter, a balun 1700, also be placed at the front of a standalone LNA test structure, as shown in FIG. 17A. The differential input impedance of an LNA (e.g. an LNA as shown in FIG. 17B) and its differential output impedance can be designed to be 50Ω and 100Ω respectively at 77 GHz. Balun 1700 can convert the differential 50Ω input impedance of the LNA to single-ended 50Ω impedance which can be easily driven by a single-ended 50Ω waveguide probe.

Figure 17D:
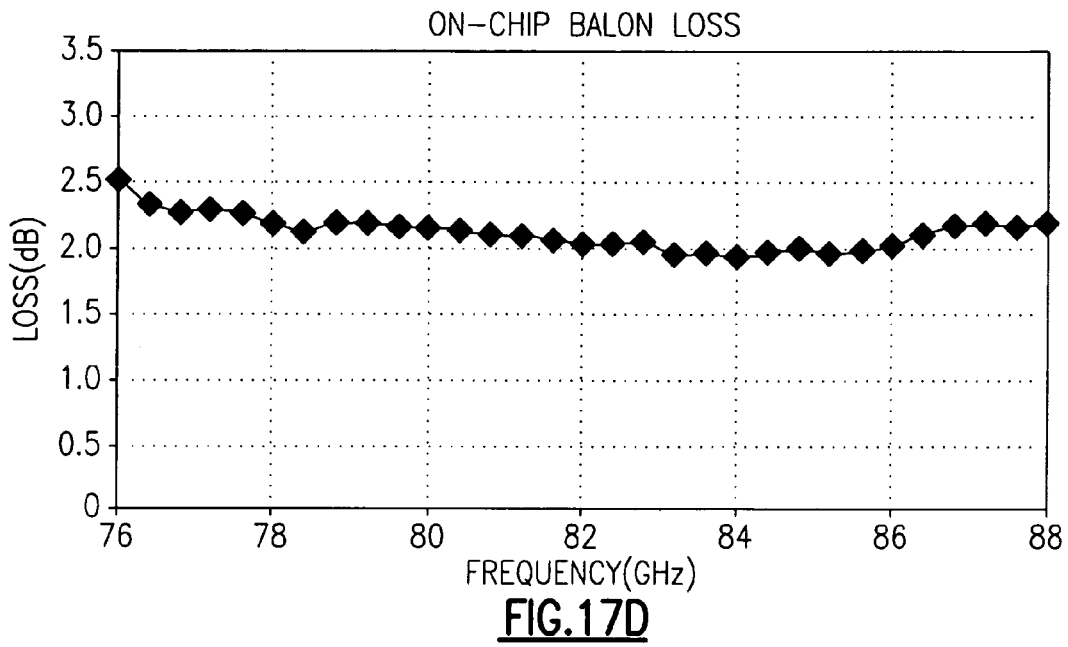
FIG. 17D shows a loss graph for an on-chip balun.
Figure 17E:
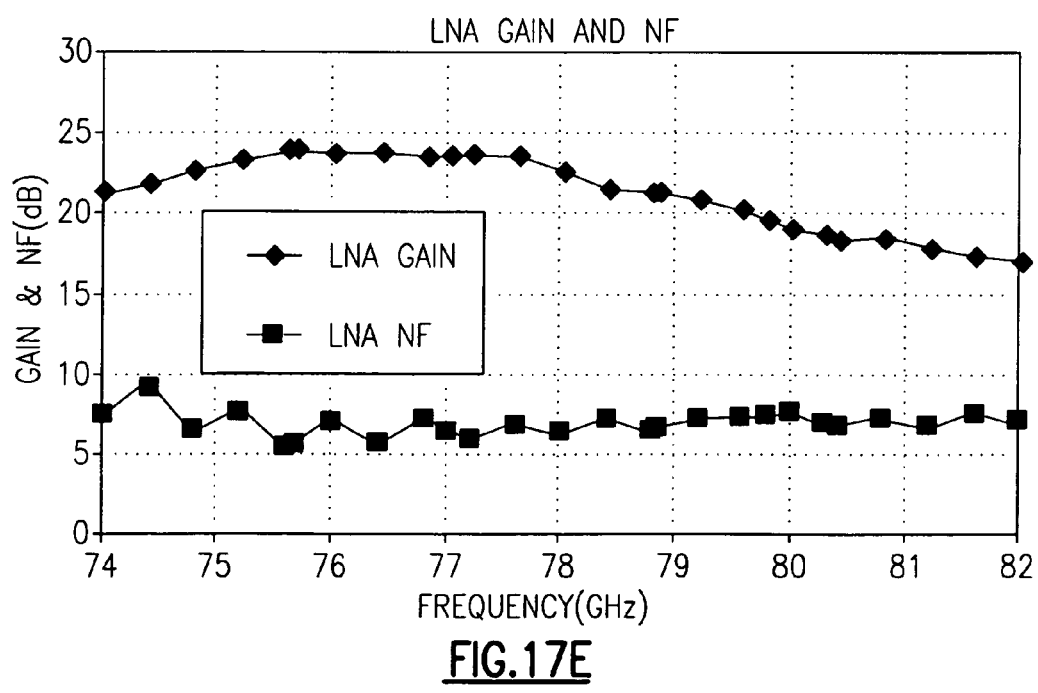
FIG. 17E shows a graph of LNA gain and noise figure.

To accurately characterize the receiver performance, a stand-alone LNA with integrated balun was measured. An important parameter for accurate de-embedding of the stand-alone LNA measurements is the loss of the balun and the following λ/4 t-line. Two identical baluns including the matching transmission lines were designed and connected together at their differential nodes, as shown in FIG. 17C. The loss of the two series identical structures was expected to be twice that of a single one. The measured balun loss and the LNA performance versus frequency are shown in FIG. 17D and FIG. 17E respectively. Standalone LNA peak gain of 23.8 dB was measured at 77 GHz with a 3 dB bandwidth of more than 6 GHz, while the lowest noise figure of 5.7 dB was measured at 75.7 GHz. The LNA consumed 17.5 mA from a 3.5V supply.

IV. Measurement Setup

The 77-GHz chip and test board were mounted on the same brass substrate by using conductive adhesive. Gold bond-wires were used to connect the power supply, ground, baseband inputs and outputs. Because the electromagnetic (EM) power was directly radiated and received by on-chip antennas, the microwave interface between the package and the chip is eliminated allowing direct in-air measurement of the transmitting and receiving pattern. The electronic performance of the receiver alone was characterized by cutting off the antenna and feeding the LNA input via wafer-probe.

Figure 17F:
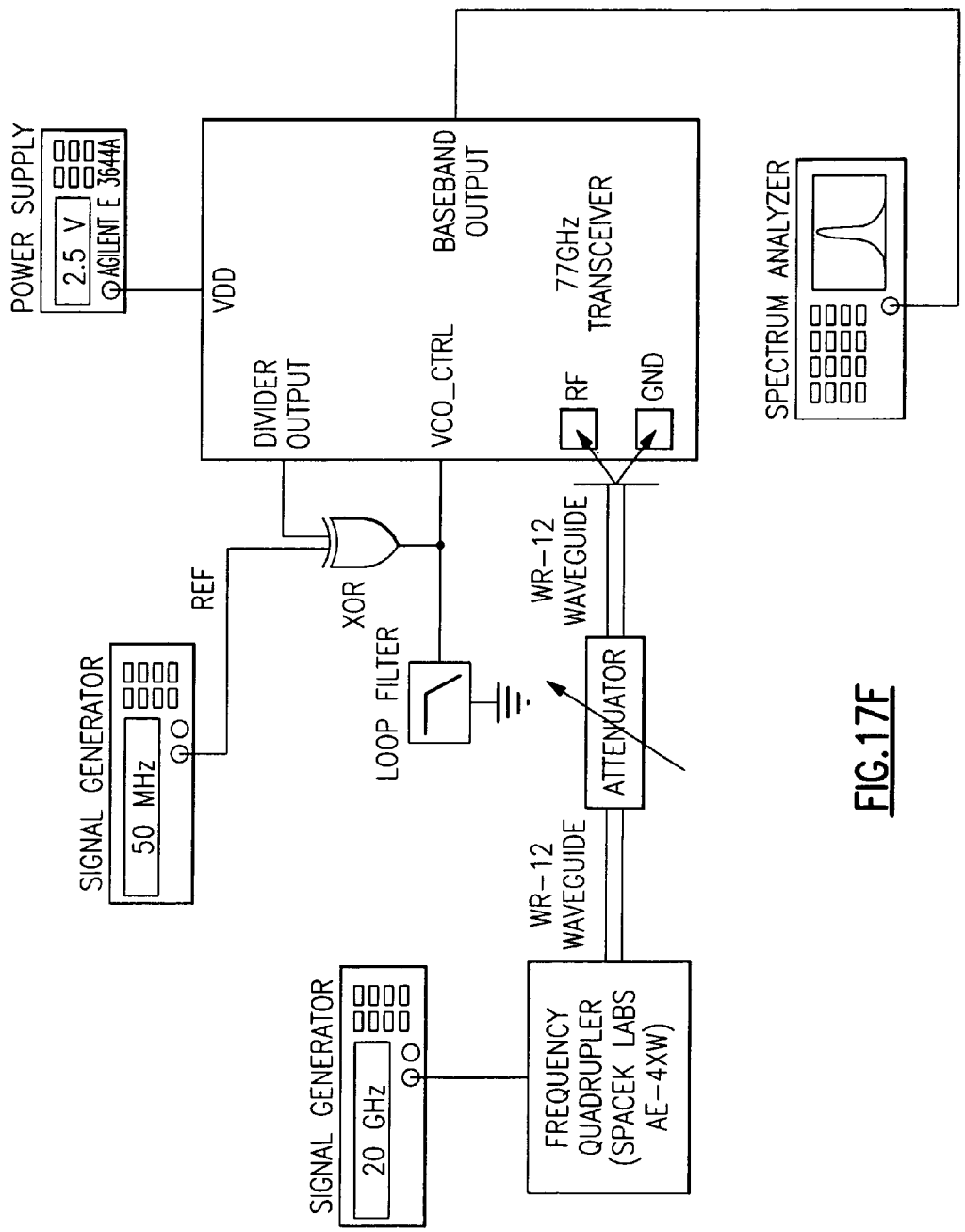
FIG. 17F shows a receiver test setup.

FIG. 17F shows the test setup for measuring receiver gain. The input signal at 77 GHz range was provided by a frequency quadrupler, Spacek Labs model AE-4XW. Another input of the frequency quadrupler was supplied by an HP 83650B signal generator useable up to 26.5 GHz. The power of the input signal can be adjusted by a variable linear attenuator. A WR-12 planar wafer probe was used to feed the single-ended signal to the LNA input. The microwave power was measured using an Agilent E4418B power meter with a HPW8486A W-band power sensor. An exclusive OR (XOR) logic gate acting as a phase detector and a first-order RC lowpass filter completed the phase locked loop (PLL) which locks the phase and frequency of the 52-GHz VCO to a 50 MHz reference provided by signal generator HP8643A. The baseband outputs were characterized using an Agilent E4448A spectrum analyzer. The same setup was also used for receiver noise figure measurement except that the RF inputs were replaced with a Noise Com NC5110 W-band noise source.

Figures 17H, 17I:
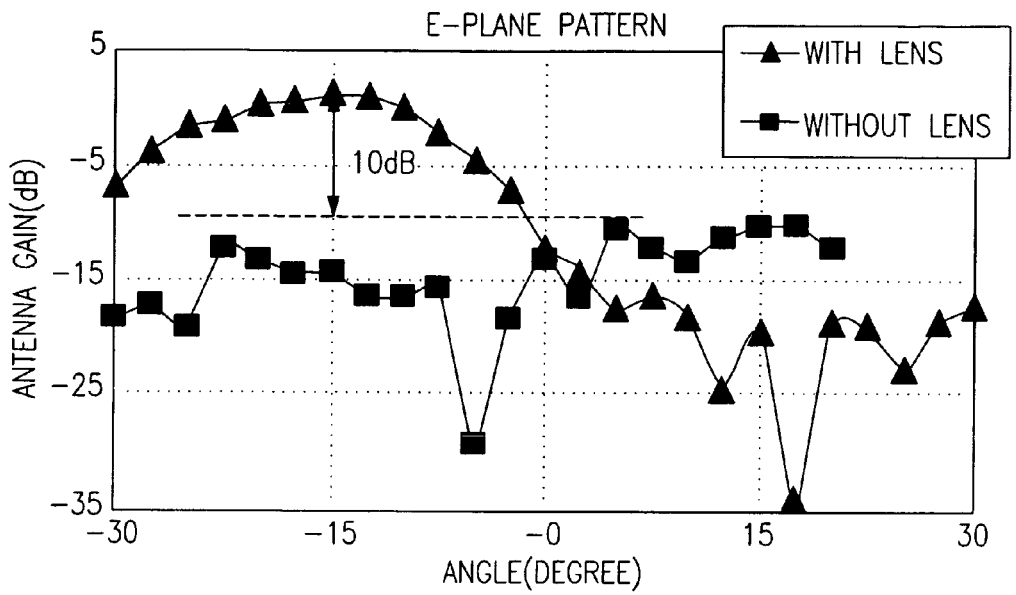
FIG. 17H shows a graph of E-plane antenna gain.
FIG. 17I shows a table receiver measurement data.

The electrical performance of the receiver was characterized after laser trimming the antennas. A 37 dB single-path receiver gain (FIG. 17G) was measured at 79.8 GHz with a 2 GHz bandwidth, corresponding to an inferred array gain of 49 dB. The minimum receiver noise figure was measured to be 8 dB (at 78.8 GHz). The radiation performance of the complete receiver is measured using the setup shown in FIG. 1A and FIG. 1B, where a PCB provided the supply as well as low frequency and digital control signals to the chip and took the baseband signal out using wirebond connections. A W-band standard horn antenna was used to irradiate the receiver. The peak measured antenna gain was +2 dBi. Based on the simulations this gain can be further improved by 4 to 5 dB using a smaller lens with a quarter-wavelength matching layer. FIG. 17H shows the measured de-embedded E-plane single-element dipole radiation pattern with and without the lens. Based on this measurement, the lens improves the gain by more than 10 dB. The measurement results are summarized in the table shown in FIG. 17I.

Transmitter Detailed Description

Figure 18:
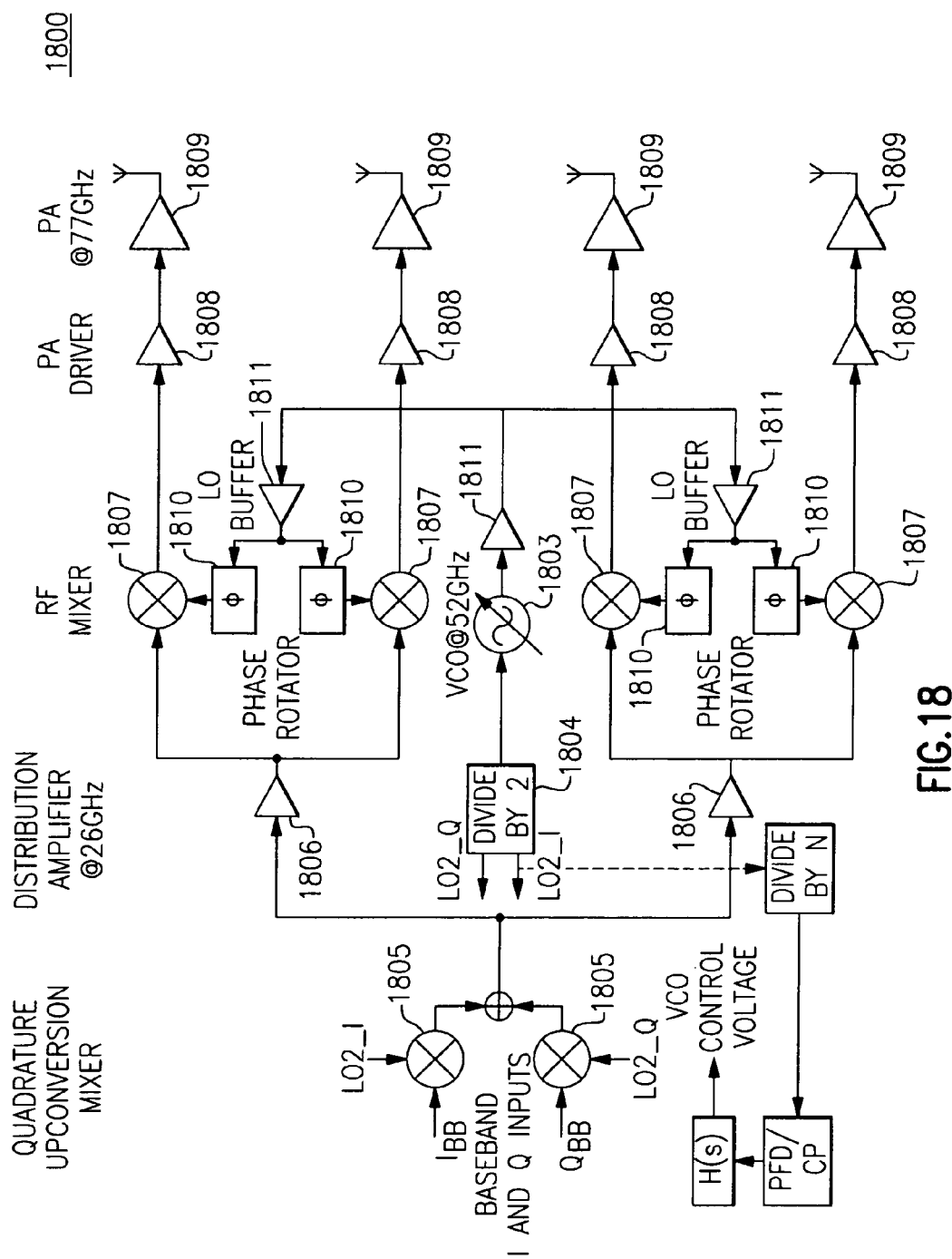
FIG. 18 shows a block diagram of an integrated transmitter.
Figure 19:
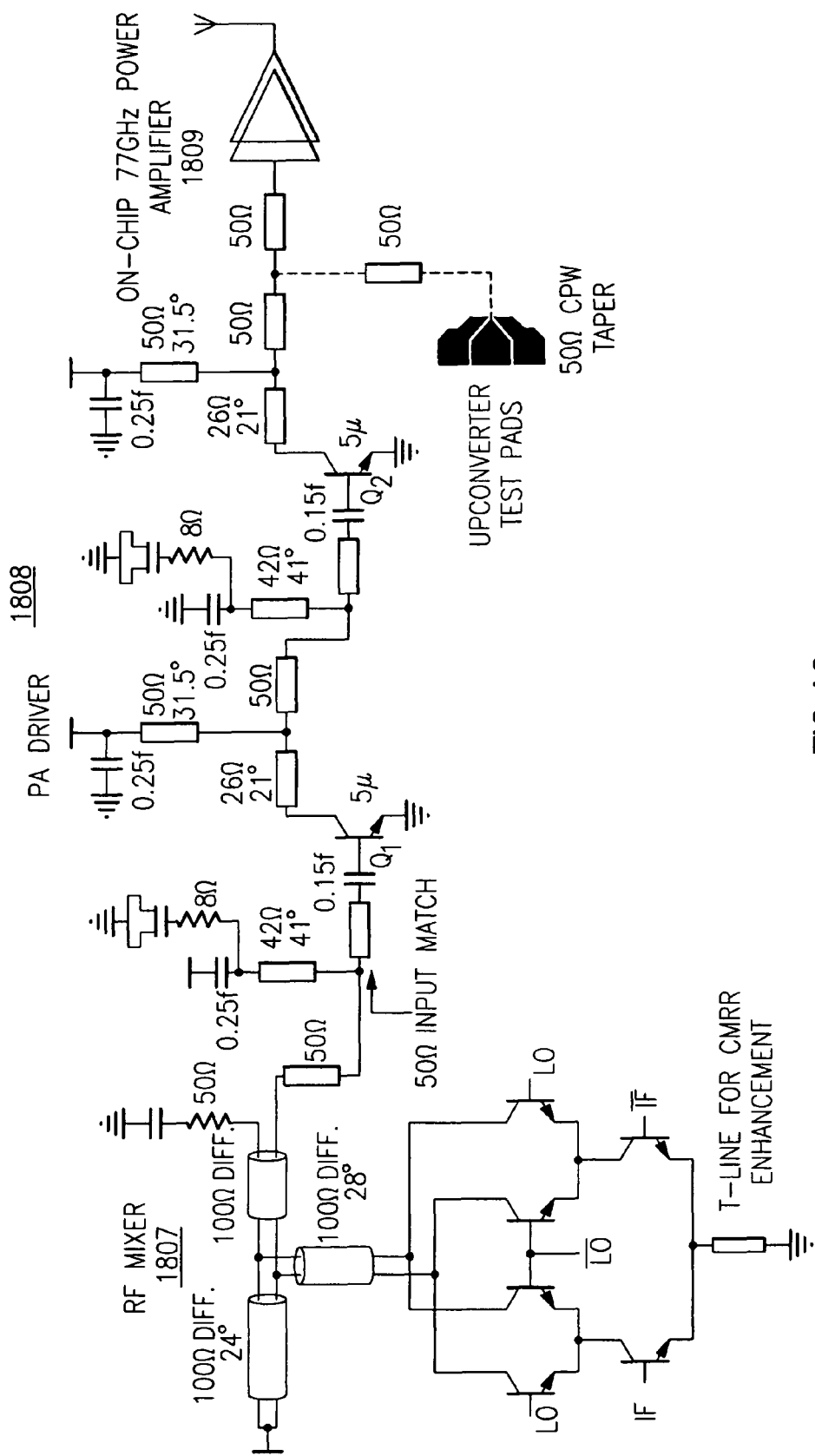
FIG. 19 shows a schematic diagram of a portion of the transmitter of FIG. 18.

An exemplary silicon-based 77 GHz phased-array transmitter 1800 with local LO-Path phase-shifting as shown in FIG. 18 includes on-chip dipole antennas 306 and also is suitable for use as a transmitter in a mm-wave receiver-transmitter. Silicon-based mm-wave transmitter 1800 leverages the benefits of integration to realize a complex system on a chip (SOC) with improved performance and reliability while significantly lowering cost. In one embodiment, transmitter 1800 can be realized as a fully-integrated 4-element 77 GHz phased-array transmitter in SiGe. Transmitter 1800 can also utilize a new local LO-path phase-shifting architecture and operate in mm-wave bands allocated for collision avoidance vehicular radar.

FIG. 18 shows a simplified block diagram of the 4-element phased-array transmitter embodiment using a 2-step upconversion architecture. Quadrature upconversion in the first stage attenuates the first image signal at the 26 GHz IF while the image of the second upconversion step is sufficiently attenuated by the cascade of 77 GHz tuned amplifying stages. The LO signal for the second upconversion stage is generated using an on-chip 52 GHz VCO 1803. A quadrature injection-locked divide-by-two 1804 generates the I and Q signals at IF for the quadrature upconversion. The choice of a 26 GHz IF allows for dual-band operation in both radar bands by bypassing the RF section for 24 GHz operation.

The output of the quadrature upconversion mixers 1805 at 26 GHz drives a pair of distribution amplifiers 1806. A long interconnect length (of the order of the wavelength) can be a major barrier to reliable signal distribution at these frequencies. In addition to the large parasitics associated with these lines, radiation and coupling issues at mm-wave can pose further challenges if not accounted for in design. To overcome these problems, we use on-chip differential microstrip tub transmission lines (t-lines) (not shown in FIG. 18) with well-defined characteristic impedances for high-frequency signal distribution throughout the chip. Optimal power transfer is ensured by matching the input and output of all high frequency blocks to the characteristic impedance of the t-lines. For example, in the case of the IF signal distribution in the transmitter, the first mixer output is matched to 50Ω (differential), while the input of each of the two parallel distribution amplifiers is matched to 100Ω (differential).

The IF output of distribution amplifiers 1806 are upconverted to 77 GHz by Gilbert-type differential upconversion mixers 1807 in each of the four elements. These 77 GHz mixers 1807 are followed by a driver stage 1808 that provides the input to the fully-integrated 77 GHz power amplifier (PA) 1809. All circuits, up to and including, RF mixers 1807 are differential whereas the PA driver 1808 and the PA 1809 are single-ended due to area limitations and to facilitate output power measurement. Accordingly, one of the outputs of the mixer is terminated to 50Ω while the other output is fed to the driver whose input is matched to 50Ω, as well. In the mixer, the 100Ω differential impedance matching at the RF and LO ports is optimized for large signal to maximize the output power at 77 GHz.

The four transmitter outputs are generated by an integrated on-chip PAs 1809 in each element. While the first three stages of each PA 1809 are designed for maximum gain, the output stage is designed for maximum efficiency. Inter-stage power matching is achieved through series t-lines and parallel shorted-stubs (not shown in FIG. 18). Each of the PAs 1809 is connected to an on-chip dipole antenna 106 that is trimmed for direct electrical measurements via pads (not shown in FIG. 18).

The 52 GHz LO is generated using a differential cross-coupled on-chip VCO (1803) with a shorted differential stub as the inductor. Its differential output signal is distributed to the phase-rotators 1810 in each element through a symmetric network of distribution buffers (1811) that ensures that the phase of the LO signal is the same at the input of the phase rotator in all transmit elements.

Four on-chip phase rotators 1810 generate the desired phase shift in the LO path for each element. This local phase generation scheme minimizes the number of t-lines carrying the 52 GHz signal over long distances and enables the use of well-defined t-lines and power-matched LO-path buffers without excessive area and power penalties. Unlike a multiphase distribution approach (e.g. as explained in H. Hashemi et al., "A 24 GHz SiGe Phased-Array Receiver-LO Phase Shifting approach," *IEEE Trans. MTT*, pp. 614-626, February 2005), the local phase-shifting presented here does not suffer from additional coupling induced phase errors and signal loss in the distribution path. In other embodiments, the phase shift resolution can be defined by the on-chip DAC or the analog control voltage used in the phase rotator.

Figure 20:
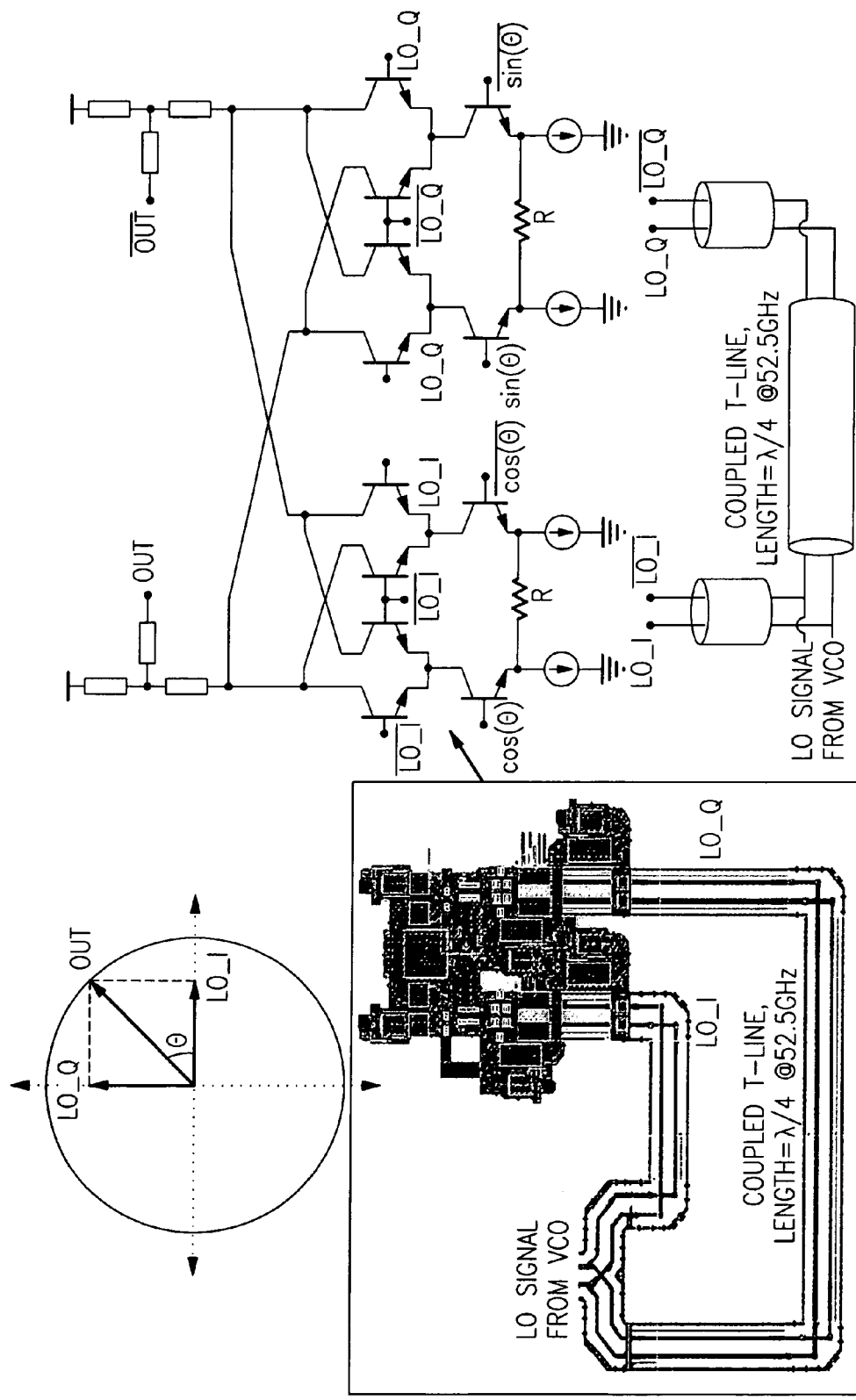
FIG. 20 shows a schematic diagram of a phase rotator.

As shown in FIG. 20, phase rotator 1810 generates the quadrature phase necessary for the phase interpolation locally by using a λ/4 t-line at 52.5 GHz. The lower emitter degenerated differential pairs in each half of the phase-shifters control the relative weights of the I and Q signals that are combined at the output of the phase-shifter 1810. Phase-shifts from −180° to 180° can be achieved by programming the DAC (not shown) to provide the appropriate I and Q control voltages.

Example 2

Transmitter chip performance was measured using a combination of waveguide-based probing and self-test mechanisms incorporated in the chip. At all high-frequency measurement points, the pads were incorporated into a tapered coplanar waveguide structure, thereby accounting for pad parasitics while maintaining a 50Ω impedance. For instance, both VCO and divide-by-two outputs were connected to such pad structures to enable direct measurement. The VCO can be tuned from 50.35 GHz to 55.49 GHz, while the locking range of the divider is 51.4 GHz to 54.5 GHz which is sufficient for our application.

Figure 21:
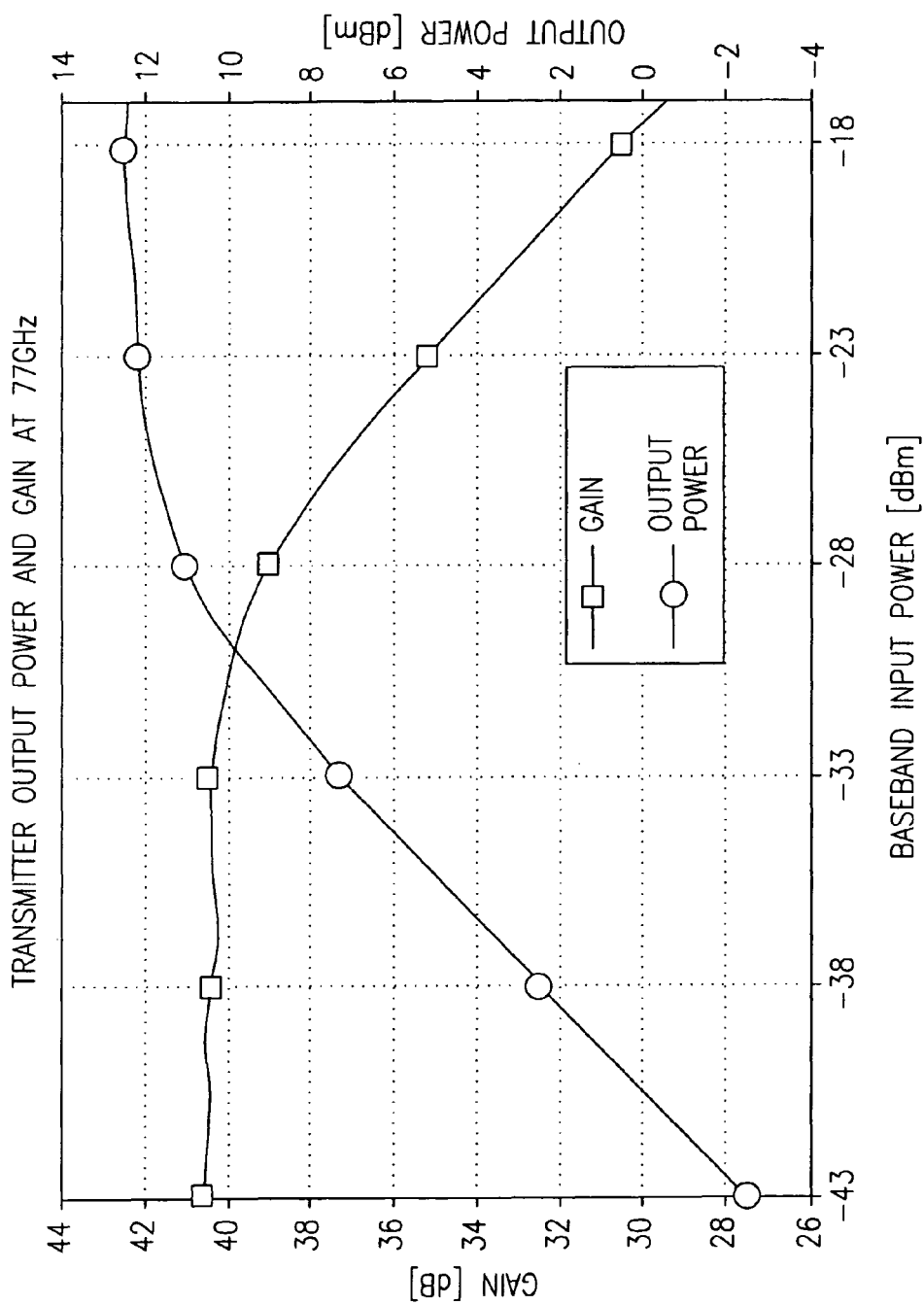
FIG. 21 shows a graph of transmitter gain vs. baseband input power.
Figure 22A:
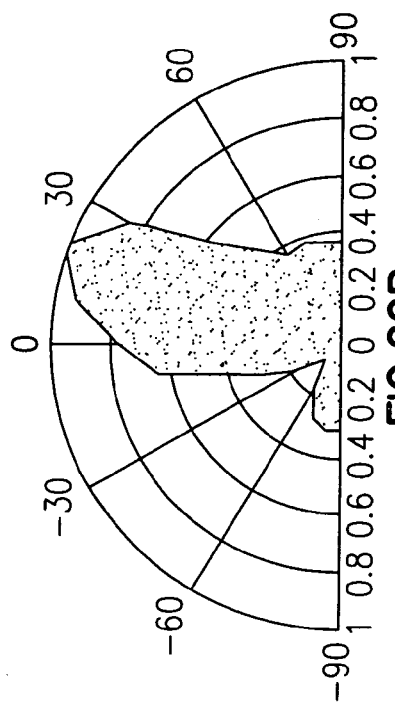
FIG. 22A through FIG. 22D show measured loopback antenna radiation patterns.
Figure 22B:
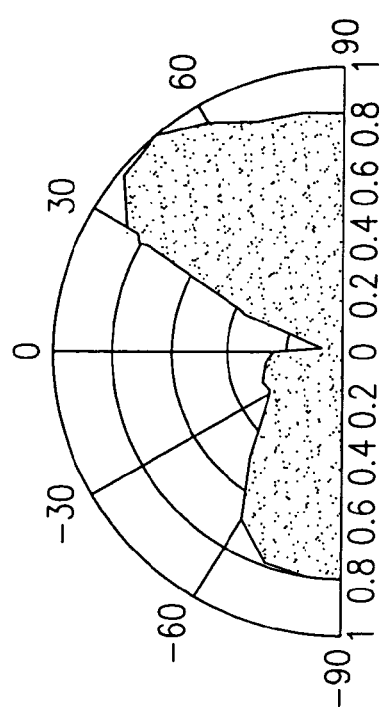
Figure 22C:
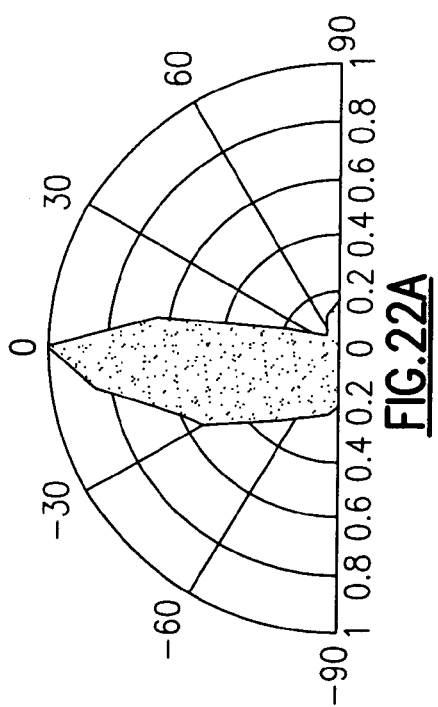
Figure 22D:
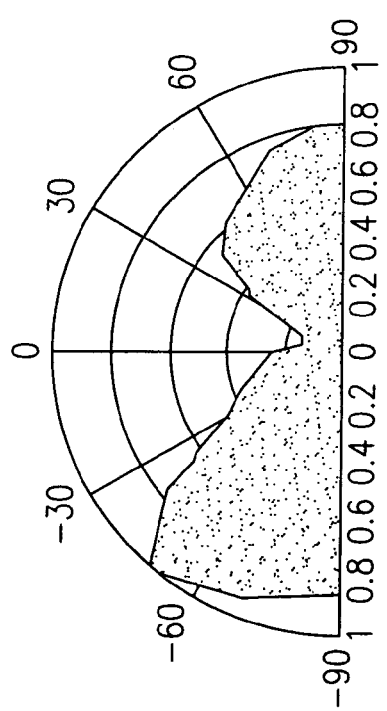

As shown in FIG. 21, a transmitter was characterized using a waveguide probe that was followed by an external downconverter (with a 59 GHz LO). The transmitter generates up to +10.1 dBm output power at 77 GHz and has 34 dB of gain from baseband to RF with a bandwidth of 2.2 GHz.

Loopback Testing

In order to test the raw beam-performing abilities of the transmitter, excluding the on-chip antennas, an internal loopback option can be implemented in which the output of the 77 GHz upconversion mixer in a transmit element is connected to the input of the 77 GHz downconversion mixer in a receive element on the same die (in a combined receiver-transmitter embodiment). This option allows for different array patterns to be measured with baseband transmitter input and baseband receiver output with no off-chip mm-wave connection.

Example 3

Figure 24:
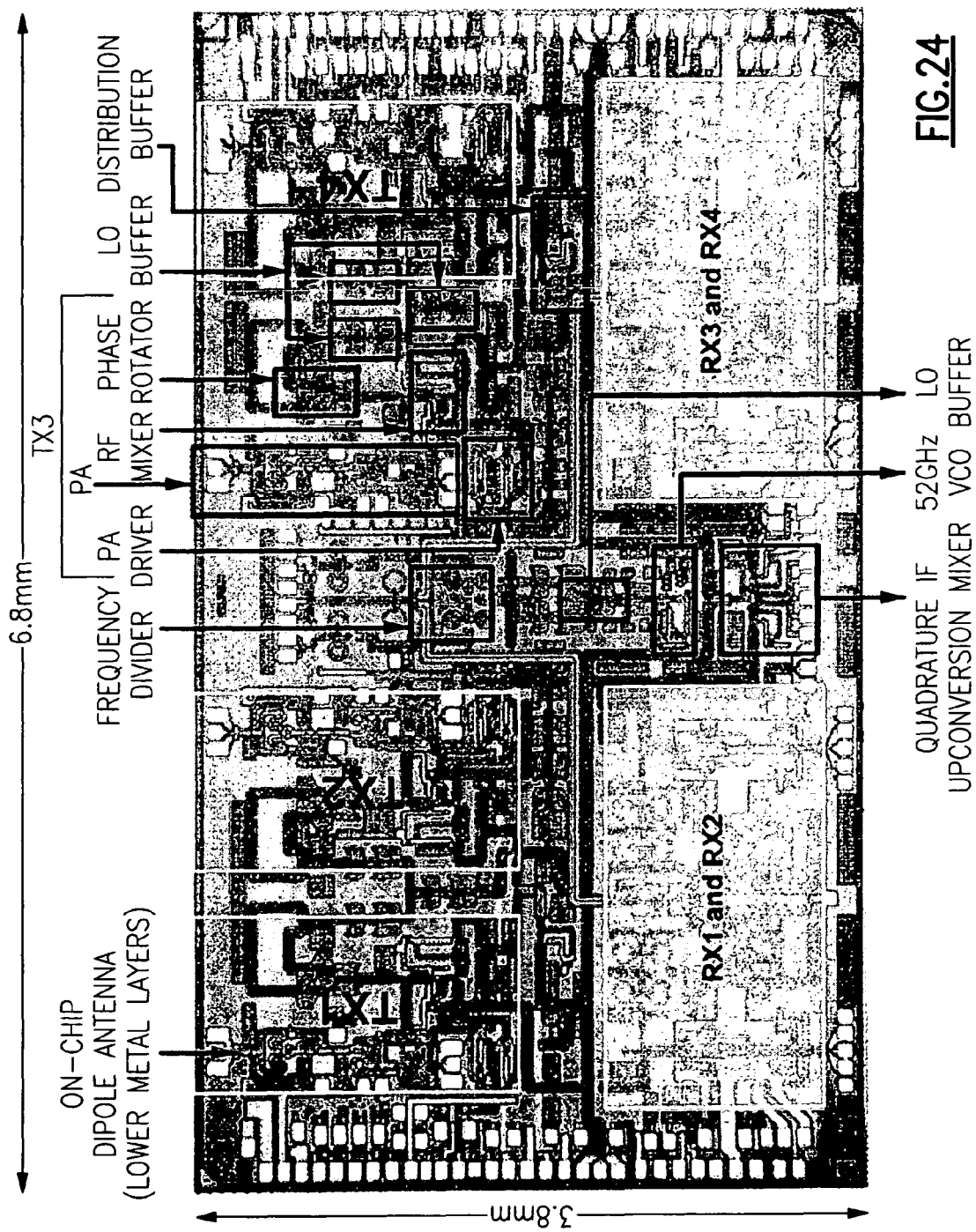
FIG. 24 shows an integrated transceiver micrograph highlighting transmitter components.

FIG. 22A through FIG. 22D show the measured patterns with 2 transmit-receive pairs active in the loopback mode which demonstrates the beam-forming capabilities of the transmitter. The transmitter was implemented in a 0.12 μm SiGe BiCMOS process with seven metal layers. The performance of the phased-array transmitter is summarized in table shown in FIG. 23. The transmitter and local phase shifting occupy 17 mm² of die area (FIG. 24).

Example 4

A silicon-based 77 GHz phased-array transmitter with local LO-path phase-shifting is now described in more detail.

I. Transmitter Testing

Figure 25:
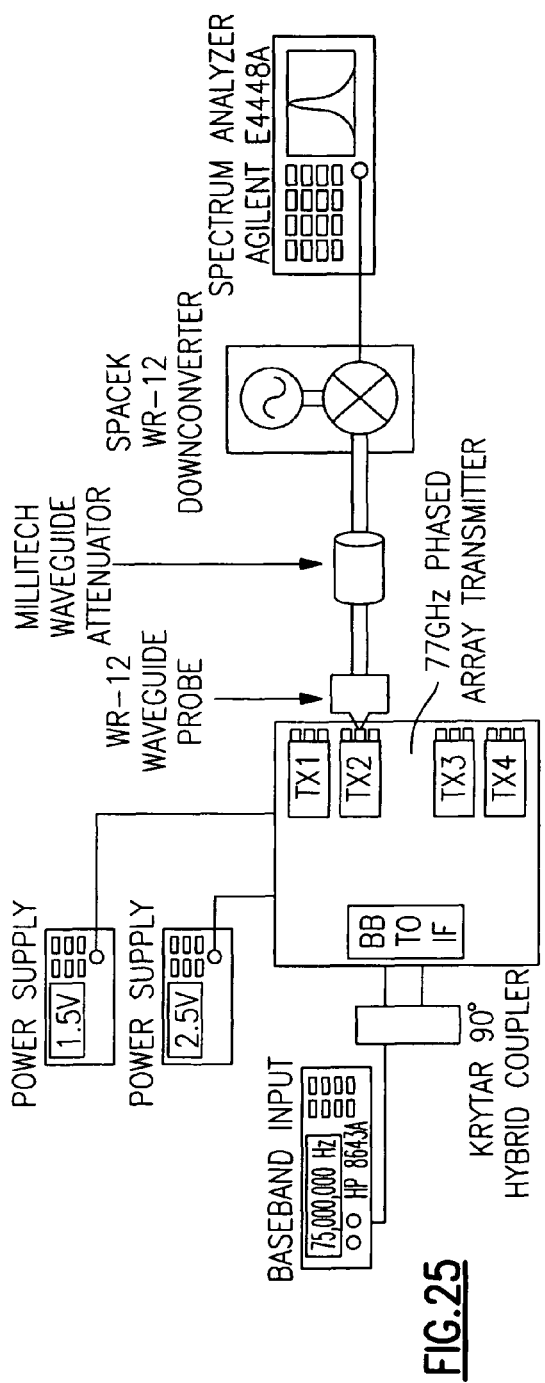
FIG. 25 shows a transmitter test setup.

A transmitter was characterized by probing the output pad with WR-12 waveguide probes (FIG. 25) while all the low-frequency connections were wirebonded to traces on a PCB. The 77 GHz output of the transmitter was downconverted externally using a WR-12 waveguide downconverter with a built-in 59 GHz oscillator. The downconverter loss was around 5 dB at 77 GHz. A 20 dB attenuator was placed before the downconverter to avoid any errors due to gain compression (small signal amplifier saturation) in the downconverter. The 18 GHz signal (after downconversion) was measured using an E4448A 50 GHz spectrum analyzer. In order to measure the power radiated at the image frequency at 26 GHz, the output of the transmitter was also probed with 65 GHz probes which were connected directly to the spectrum analyzer.

II. VCO and Injection-Locked Divider

Figure 26:
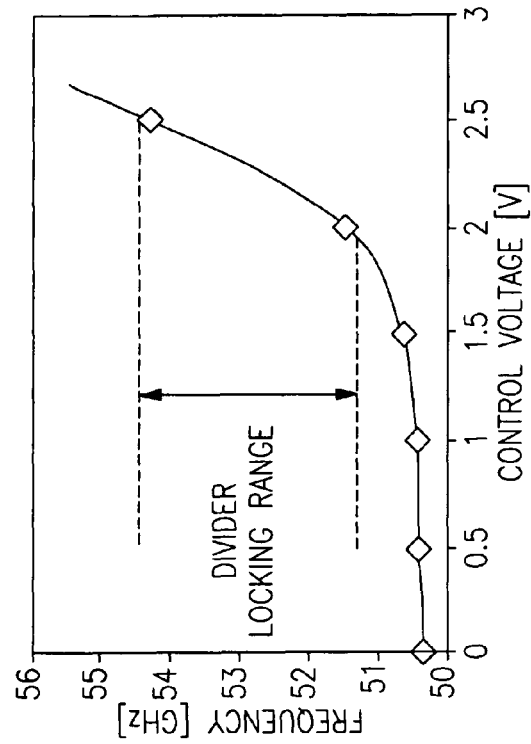
FIG. 26 shows a graph of VCO frequency vs. control voltage.
Figure 27A:
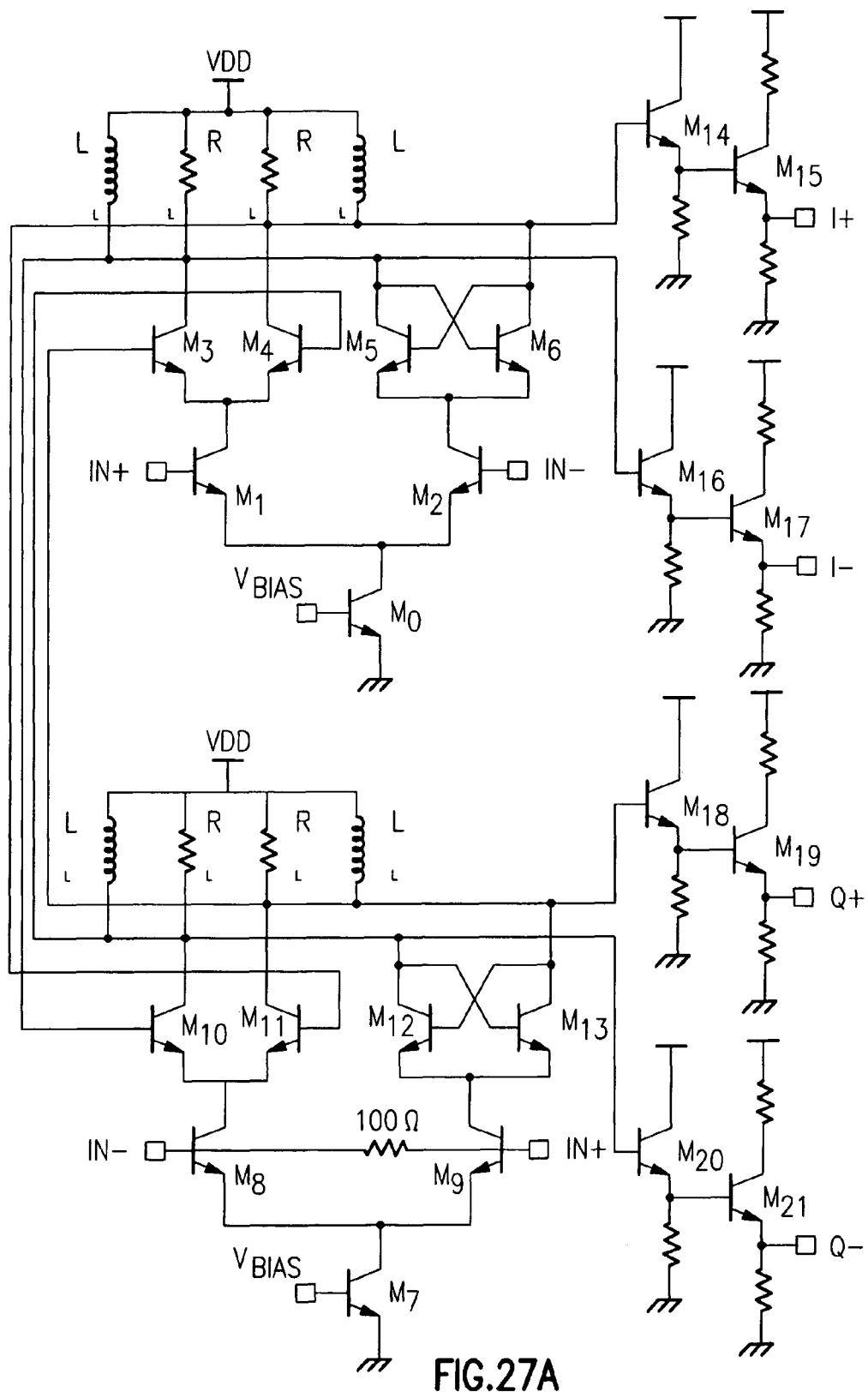
FIG. 27A shows a schematic diagram of a quadrature injection-locked divide by two circuit.
Figure 27B:
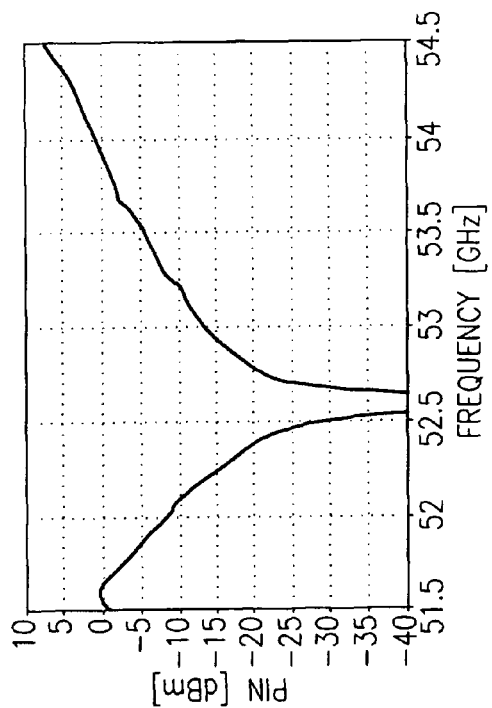
FIG. 27B shows a graph of the performance of the circuit of FIG. 27A.

The 52 GHz on-chip VCO was found to be tunable from 50.35 GHz to 55.49 GHz (FIG. 26). The VCO drove a quadrature injection-locked frequency divider (QILFD) that generated the 26 GHz LO quadrature signals. The topology of the QILFD in this work was devised based on the architecture of a quadrature oscillator, as shown in FIG. 26. The input signal was injected at the tail current of a basic cross-coupled quadrature oscillator formed by the transistors $M_0 \sim M_{13}$. Due to the symmetric cross coupling between $M_3$, $M_4$, $M_{10}$, and $M_{11}$, the relative phase of the four outputs was clearly defined. A 100Ω resistor was connected between the differential inputs to provide impedance matching to the driving transmission line. A two-stage buffer was used at each output to provide the desired DC level for the cascaded blocks, isolation between the load and the oscillating core, and driving capabilities for the 50Ω load. The divider core consumed 3 mA in total while each two-stage buffer consumed 7.2 mA. FIG. 27 shows a plot of the divider sensitivity which used the minimum input power (calibrated up to the probe) needed for the divider to lock.

III. Microstrip Tub Structure Used for Signal Distribution

Figure 28:
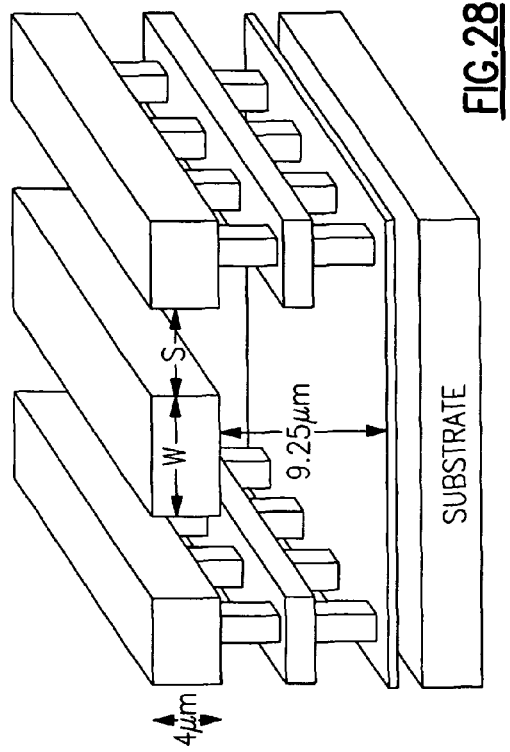
FIG. 28 shows a micro-tub structure useful for matching and signal routing.
Figure 29:
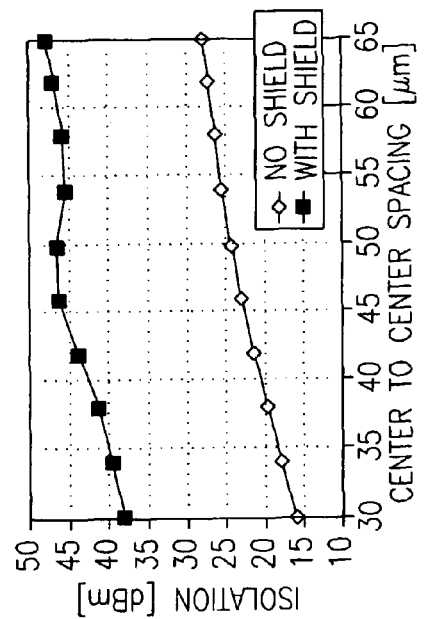
FIG. 29 shows a graph of isolation with and without side to side shielding in a microstrip structure.

The microstrip-tub structure as shown in FIG. 28, or a differential microstrip-tub structure (with two signal lines that are shielded by ground lines on the sides and on the bottom), was used for matching and signal distribution throughout the chip. The presence of the side shields increases isolation between adjacent lines, allowing for compact layout. FIG. 29 shows the isolation between two adjacent 50Ω lines vs. their center-to-center spacing. The lines were implemented using the top three metal layers available in the process. The lower metals were left for routing of low frequency signals. The use of the side shield increased the isolation by more than 20 dB. The transmission lines were also simulated using IE3D and their loss at 77 GHz was found to be less than 1.5 dB/mm.

IV. Power Amplifier

Figure 30:
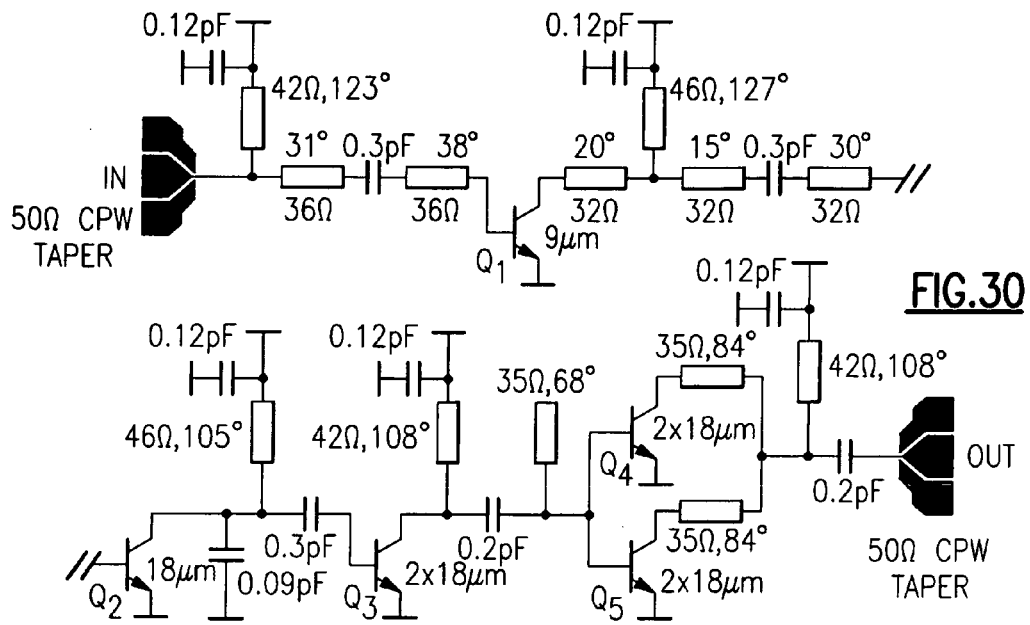
FIG. 30 shows a schematic diagram of a power amplifier.

A schematic of the power amplifier tested is shown in FIG. 30. The amplifier consists of 4 gain stages, where output stage is designed for maximum efficiency and the other stages are designed for maximum gain. The last three stages use 1, 2, and 4 identical transistor cells respectively. This geometric increase in transistor size from stage to stage ensures that the output transistors will enter compression (small signal saturation) first as long as the preceding stage has at least 3 dB of gain. The amplifier is biased in class-AB mode. Transistors are biased at their maximum $f_{max}$ (1.2 mA for 1 μm of emitter length).

In the process used, the $BV_{CEO}$ limit is set by the impact ionization effect. If the base is driven with lower source impedance this breakdown voltage will increase. In this case, voltage swing is limited by $BV_{CER}$ rather than $BV_{CEO}$, where in the process used $BV_{CER}$ is around 4V for $R_B$ equal to 300Ω. Therefore, the bias circuitry is designed to provide a base resistance of 300Ω for the transistors in the amplifier.

The matching networks use series transmission lines and parallel shorted-stubs for power match between different stages. At the input of the last stage, an open stub provides a lower matching network loss. At the output of second stage matching was achieved with a parallel MIM capacitor. The capacitors at the end of shorted parallel stubs are in parallel with a series RC network (not shown in figure for simplicity). R and C can be chosen to reduce the gain of the amplifier at low frequencies, thus enhancing stability.

Figure 31:
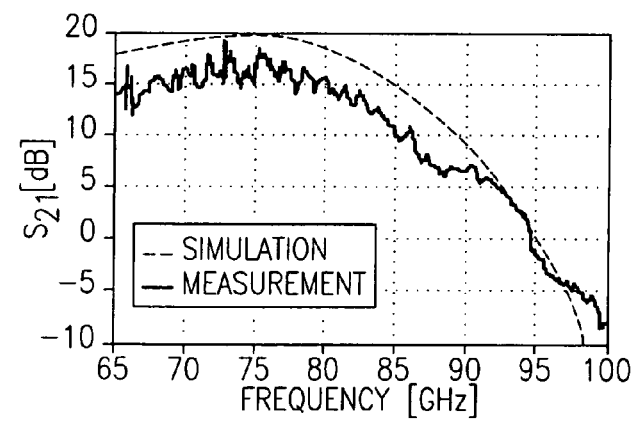
FIG. 31 shows a graph of actual and simulated amplifier gain vs. frequency.
Figure 32:
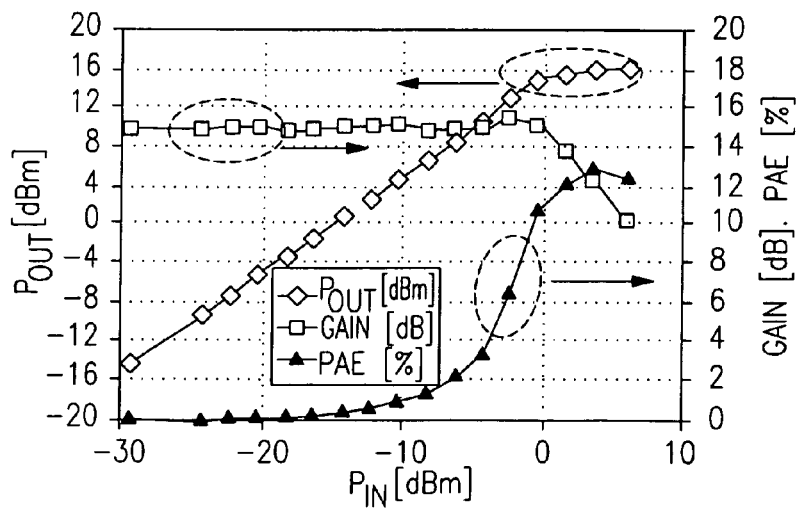
FIG. 32 shows measured large signal parameters of an amplifier.

The simulated and measured small-signal gain of the amplifier is shown in FIG. 31. The amplifier was found to have a 3 dB bandwidth of at least 15 GHz and exhibited gain to 94 GHz. The large-signal parameters of the amplifier were measured and plotted as shown in FIG. 32. The amplifier was found to generate up to +16 dBm for a supply voltage of 1.5V with a compressed gain of 10 dB. A peak PAE of 12.8% was achieved at peak output power. The output-referred 1 dB compression point of the amplifier was found to be 14.5 dBm. As expected, the additional gain and power in the input stages forced the output stage to compress first.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Antenna Design Theory

An antenna converts electrical power in the circuit domain to electromagnetic wave radiations in a propagation medium and vice versa. The radiated energy appears as loss if looked at from a pure circuit domain perspective and is thus modeled as a resistance. A reactive part can also be used to account for the resulting phase difference between the antenna's voltage and current. In addition to this so-called "radiation resistance" which is essential to the antenna operation, a second resistive part is required to model the physical energy loss in the non-ideal metals and the dielectrics. For an antenna excited with a current source, loss and radiated power can be calculated as, $$P_{rad} = R_{rad} I^2/2,$$
$$P_{loss} = R_{loss} I^2/2 \qquad (1)$$

where $P_{rad}$ is the radiated power, $P_{loss}$ is the lost power, $R_{rad}$ is the radiation resistance, $R_{loss}$ is the loss resistance and I is the antenna current. Obviously, high loss resistance wastes power and lowers the overall efficiency. In fact, radiation efficiency is directly related to the ratio of loss and radiation resistances. When these two values are known, radiation efficiency can be calculated as, $$\eta_{rad} = \frac{R_{rad}}{R_{rad} + R_{loss}} \qquad (2)$$

In this section, we focus on important antenna parameters such as gain and efficiency and compare several antenna configurations suitable for silicon on-chip implementation based on these parameters.

A. Radiating from Topside without Ground Shield

Figure 33:
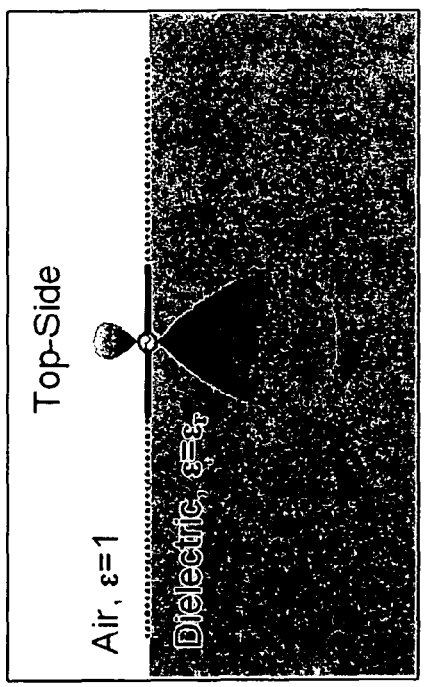
FIG. 33 shows a representation of radiation from a top side without a ground shield.

The most obvious choice for on-chip antennas is to implement them as metal lines on top of the substrate and radiate upward into the air. In this subsection, we show why this may not be an effective solution by looking at a dipole antenna placed at the boundary of semi-infinite regions of air and dielectric (FIG. 33). Although this over-simplified configuration does not correspond to the practical setting, it guides us to better understand the effects of silicon high dielectric constant on antenna radiation pattern and efficiency. For a dipole antenna seeing the vacuum (or air) on one side and a dielectric on the other side, the ratio of the power coupled into air to the total radiated power is approximated, to within a factor of 2 (e.g. as described by D. B. Rutledge, et al., "Integrated-Circuit Antennas," Infrared and Millimeter-Waves, New York: Academic, pp. 1-90, 1983 or N. Engheta, and C. H. Papas, Radio Sci. 17, 1557-1566, 1982), as $$\frac{P_{air}}{P_{total}} = \frac{1}{\varepsilon^{3/2}} \qquad (3)$$

where $P_{air}$ is the radiated power into air, $P_{total}$ is the total radiated power and $\varepsilon$ is the dielectric constant. From this formula for silicon dielectric ($\varepsilon \sim 11.7$) a very small portion of the power radiates into the air (about 3%) and the rest of it couples into silicon. This demonstrates that without any mechanism to reroute the power coupled into silicon substrate it is not possible to implement a high efficiency antenna on-silicon this way.

B. Radiating from Topside with on-Chip Ground Shield

Figure 35:
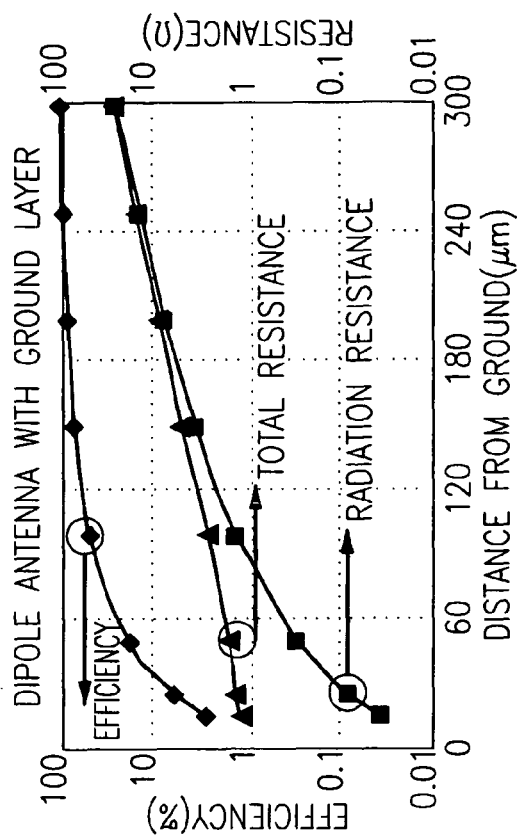
FIG. 35 shows a graph of dipole radiation resistance vs. efficiency on a grounded substrate.
Figure 34:
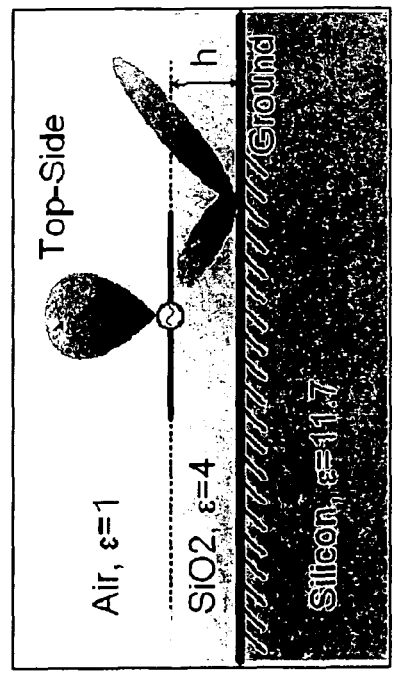
FIG. 34 shows a representation of radiation from a top side with an on-chip ground shield.

Another possible option is to incorporate an on-chip ground shield and trying to reflect the radiated energy upward, thus preventing it from coupling into silicon, as shown in FIG. 34. In this case, the on-chip antenna and the ground shield have to be placed inside the $SiO_2$ due to process limitations. For such a configuration the distance of the antenna and the ground shield affects the antenna-ground coupling and determines the radiation resistance (e.g. as described by T. Al-Attar, A. Hassibi, and T. H. Lee, "A 77 GHz Monolithic IMPATT Transmitter in Standard CMOS Technology," IEEE MTT-S International Microwave Symposium, pp. 1571-1574, Jun. 12-17, 2005 and T. Al-Attar and T. H. Lee, "Monolithic Integrated Millimeter-Wave IMPATT Transmitter in Standard CMOS Technology," IEEE Transactions on Microwave Theory and Techniques, vol. 53, no. 11, pp. 3557-3561, November 2005). Unfortunately the distance between the bottom of the top metal layer and the top of the lowest metal layer rarely exceeds 15 μm in today's process technologies. This small antenna-ground spacing causes a strong coupling between the antenna and the ground layer which lowers the all-important radiation resistance. FIG. 35 shows the results of the electromagnetic simulations of a copper dipole antenna placed over a metal ground plane with a $SiO_2$ dielectric of thickness, h, sandwiched in between. The dipole dimensions are 4 μm×20 μm×1150 μm and a moment-based EM simulator, IE3D, was used to perform the simulations. The dipole-length is equal to a length of a resonant dipole at 77 GHz which is placed in the boundary of semi-infinite regions of air and $SiO_2$. Based on this simulation, for a spacing of 15 μm between the antenna and the ground layer, the radiation resistance is very small (less than 0.1Ω) hence the total resistance is dominated by the ohmic loss of the copper resulting in a radiation efficiency of less than 5%. An option to increase the efficiency of the antenna seems to be the implementation of an off-chip ground shield to increase the distance between the antenna and its ground layer. We will discuss this case in the next subsection.

C. Radiating from Topside with Off-Chip Ground Shield

Figure 36:
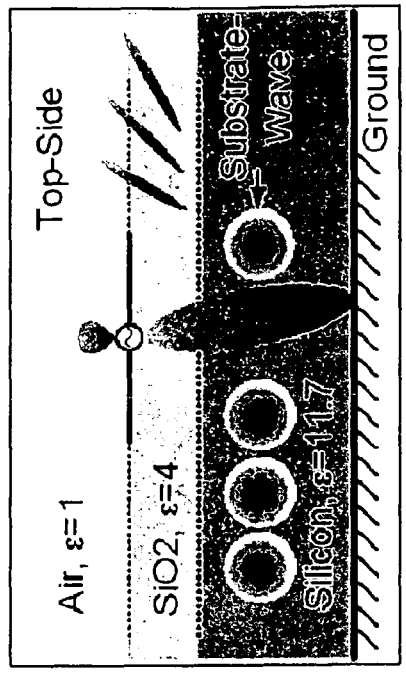
FIG. 36 shows a representation of radiation from a top side with an off-chip ground shield.
Figure 37:
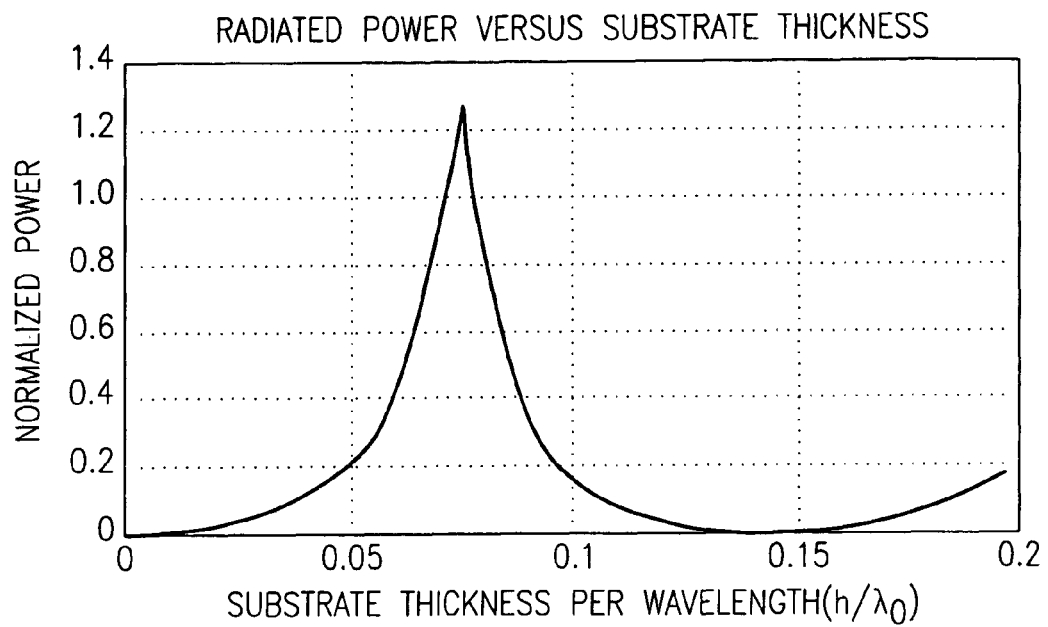
FIG. 37 shows a graph of normalized radiated power for a grounded dipole.
Figure 38:
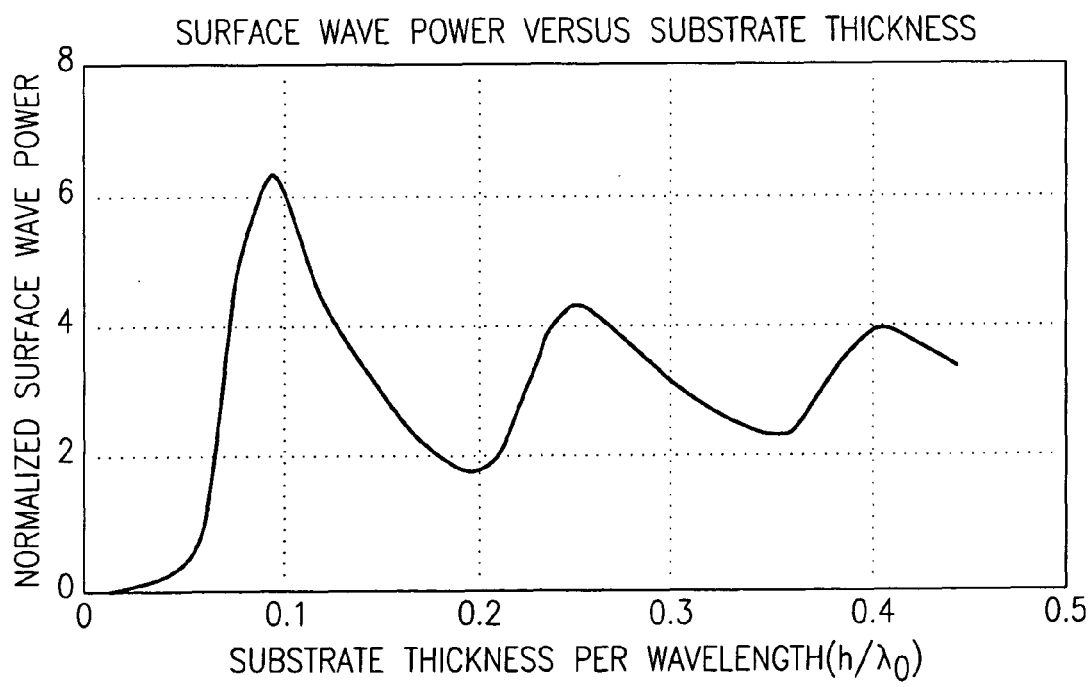
FIG. 38 shows a graph of surface wave power for a grounded dipole.

As shown in FIG. 36, an off-chip ground shield can be placed underneath the silicon substrate. In this case the silicon substrate thickness is much larger than $SiO_2$ layer and effectively we are dealing with a high dielectric constant substrate ($\in$=11.7). Unfortunately, because of the high dielectric constant of silicon and the large substrate thickness (100 μm or more) most of the power gets absorbed into surface-wave power (e.g. as discussed in D. B. Rutledge, et al., "Integrated-Circuit Antennas," Infrared and Millimeter-Waves, New York: Academic, pp. 1-90, 1983, N. Engheta, and C. H. Papas, Radio Sci. 17, 1557-1566, 1982, and H. Kogelnik, In "Integrated Optics" (T. Tamir, ed.), ch. 2. Springer-Verlag, New York). If we assume the thickness of $SiO_2$ is negligible compared to that of silicon, then the surface-wave power can be numerically calculated. Based on these results, normalized radiated power and surface-wave power are plotted in FIG. 37 and FIG. 38 respectively. These quantities are normalized to dipole's free space radiated power (as was shown by D. B. Rutledge, et al. in "Integrated-Circuit Antennas):

$$P_0 = \omega^2 \mu_0^{3/2} \in_0^{1/2} I^2 d^2 / 12\pi \quad (4)$$

where I is the current, ω is the angular frequency, d is the effective length of the dipole, $\mu_0$ is the permeability of vacuum and $\in_0$ is the permittivity of free space. As is shown in FIG. 5, at 77 GHz the maximum radiated power which is around 1.3 $P_0$ occurs at the silicon substrate thickness of 290 μm (h=0.075$\lambda_0$). However, at this substrate thickness, the power in all the surface wave modes is more than 3.5 $P_0$ (FIG. 38), which indicates that even in the case of lossless silicon substrate, the power wasted in the surface wave modes is 2.7 times greater than the useful radiated power. It is important to realize that for a lossy and finite-dimensional substrate, the surface-wave power is either dissipated due to the substrate conductivity or radiated from the edge of the chip and that often results in an undesirable radiation pattern.

D. Radiating from the Planar Backside

Figure 40:
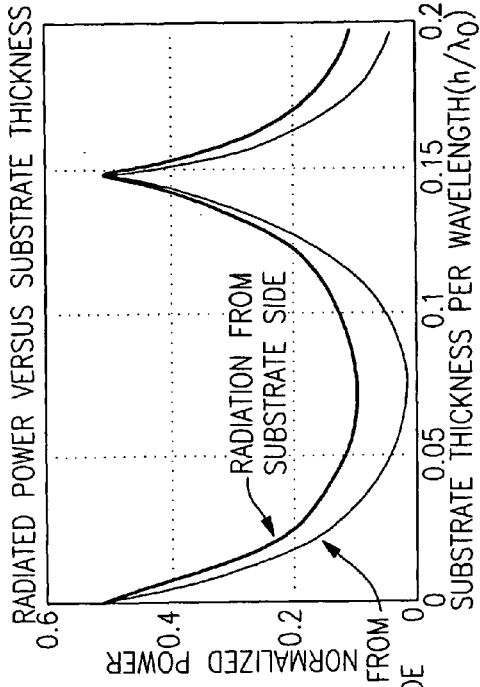
FIG. 40 shows a graph of normalized radiated power for an ungrounded dipole.
Figure 42:
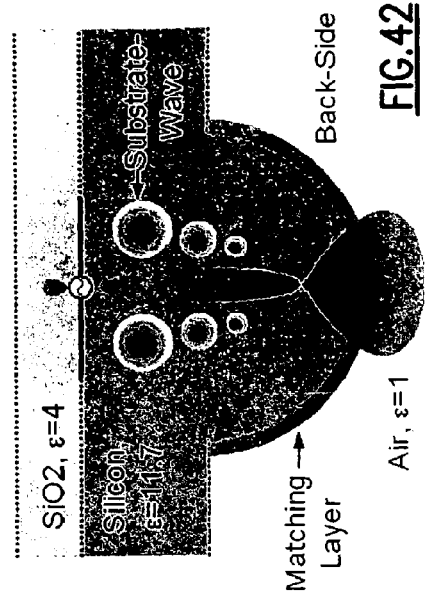
FIG. 42 shows a representation of radiation from a backside using a silicon lens.
Figure 39:
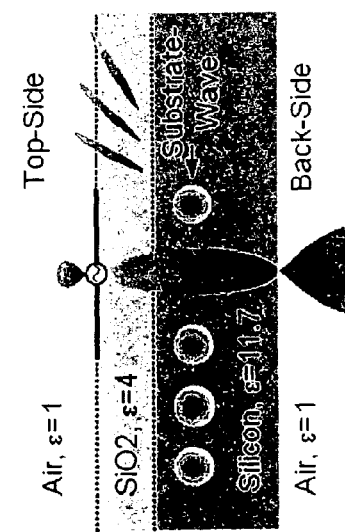
FIG. 39 shows a representation of radiation from a planer backside.

Following the prior discussion we attempt to determine what happens if we remove any ground shield and radiate from the backside of the chip (see FIG. 39). In this case, based on numerical calculations of D. B. Rutledge, et al. and H. Kogelnik, the normalized radiated and surface-wave powers are plotted in FIG. 40 and FIG. 41, respectively. At 77 GHz the total radiated power, the sum of the power radiated from the air side and the substrate side, peaks at the silicon substrate thickness of 580 μm (h=0.15$\lambda_0$) and approaches $P_0$. At this substrate thickness, the total surface-wave power is around 3.4 $P_0$ which is 3.4 times greater than the power radiated from the air side and the substrate side combined.

E. Radiating from the Back-Side Using a Dielectric Lens

Figure 41:
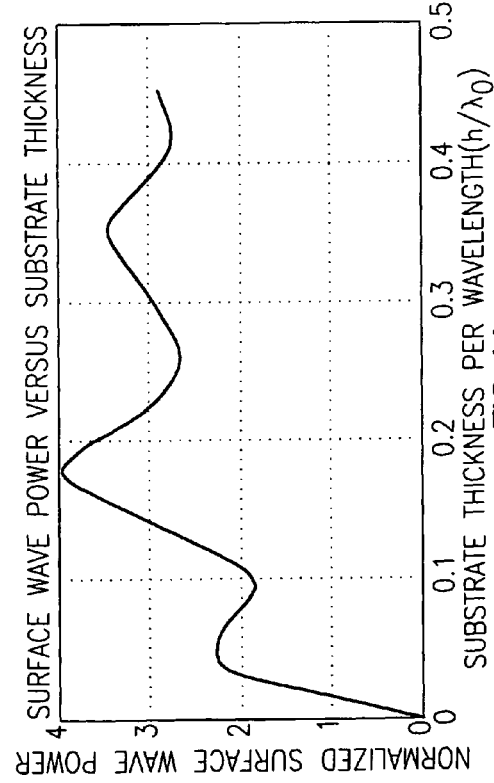
FIG. 41 shows a graph of surface wave power for an ungrounded dipole.

Fortunately the amount of the total power absorbed into surface-waves depends on the geometry of the substrate. A hemispherical silicon lens with a matching layer can convert the surface-wave power to a useful radiated power (e.g. as described by Rutledge, Engheta, et. al., Kogelnick, and others). This configuration is illustrated in FIG. 41. A quarter wave-length matching layer can be used to match the silicon impedance ($Z_{si}$=110Ω) to air impedance ($Z_{air}$=377Ω) (as described by M. J. M. van der Vorst, P. J. I. de Maagt, and M. H. A. J. Herben, "Effect of internal reflections on the radiation properties and input admittance of integrated lens antennas," IEEE Trans. Microwave Theory and Techniques, vol. 47, no. 9, pp. 1696-1704, September 1999). In some embodiments of our design we have used the silicon lens without the matching layer due to the fabrication limitations. In this design, antennas can be fabricated by using bottom metal layers to minimize the distance to the substrate. A parallel combination of three bottom metal layers maintains high antenna metal conductivity. To further reduce the substrate loss, the silicon chip is thinned down to 100 μm. This minimizes the path length through which the radiated wave travels inside the lossy doped substrate. In some embodiments of our design, the antennas are placed at the edge of the chip and a slab of undoped silicon is abutted to the substrate to maintain a uniform dielectric constant substrate underneath the antenna (FIG. 1A and FIG. 1B). For mechanical stability, a 500 μm-thick un-doped silicon wafer is placed underneath the chip and the silicon lens is mounted on the backside seen in FIG. 1A and FIG. 1B. All of the low frequency connections are brought to the chip by board metal traces and wire-bond connections. As this setup is highly compatible with flip-chip technology, all of these low frequency signals can be carried by flip-chip connections as well.

While the present invention has been particularly shown and described with reference to the structure and methods disclosed herein and as illustrated in the drawings, it is not confined to the details set forth and this invention is intended to cover any modifications and changes as may come within the scope and spirit of the following claims.

What is claimed is:

1. A phased array mm-wave device, comprising:
   a single silicon substrate;
   mm-wave circuitry comprising at least a selected one of:
      a transmitter section comprising:
         a mm-wave transmitter integrated onto said substrate, said transmitter configured to transmit a mm-wave signal; and
         a first phased array antenna system integrated onto said substrate, said first phased array antenna system electrically coupled to said mm-wave transmitter, said first phased array antenna system including two or more antenna elements;
      and
      a receiver section comprising:
         a mm-wave receiver integrated onto said substrate, said receiver configured to receive a mm-wave signal; and
         a second phased array antenna system integrated onto said substrate, said second array antenna system electrically coupled to said mm-wave receiver, said second phased array antenna system including two or more antenna elements; and one or more dielectric lenses operatively coupled to at least a selected one of said first phased array antenna system and said second phased array antenna system to improve the transmission or the reception of mm-waves from or by the respective phased array antenna system;

wherein all of the mm-wave circuitry is integrated onto said substrate, thereby eliminating a need to couple mm-wave signals off said substrate.

2. The device of claim 1 wherein the two or more antenna elements are dipole antennas.

3. The device of claim 1 wherein said one or more dielectric lenses is a single dielectric lens operatively coupled to the one or more antenna elements.

4. The device of claim 1 wherein said one or more dielectric lenses includes a plurality of dielectric lenses individually operatively coupled to at least one of said antenna elements.

5. The device of claim 1 wherein the device is constructed as a flip chip and wherein the antennas and at least one dielectric lens are mounted in contact with the flip chip.

6. The device of claim 1 wherein the device further includes a silicon wafer disposed between the substrate and the dielectric lens.

7. The device of claim 1 wherein the dielectric lens is a shaped structure.

8. The device of claim 7, wherein said shaped structure is a substantially spherical section.

9. The device of claim 7, wherein said shaped structure is a substantially hemispheric shaped section.

10. The device of claim 7, wherein said shaped structure is a substantially elliptical shaped structure.

11. The device of claim 1 wherein the relative position of one or more antenna elements is at a positive or negative extension of one of said one or more dielectric lenses.

12. The device of claim 1 wherein said one or more dielectric lenses comprise a silicon dielectric.

13. The device of claim 1 wherein said one or more dielectric lenses comprise a ceramic dielectric.

14. The device of claim 1 wherein said one or more dielectric lenses comprise a mechanically cut and polished dielectric lens.

15. The device of claim 1 wherein said one or more dielectric lenses further comprise a layer of dielectric matching material.

16. The device of claim 1, wherein the first phased array antenna system and the second phased array antenna system are separate phased array antenna systems.

17. The device of claim 1 wherein the first phased array antenna system and the second phased array antenna system are a common phased array antenna system.

18. The device of claim 1 wherein the device is used for voice or data communications.

19. The device of claim 18 wherein the voice or data communications is substantially in a 24 GHz or 60 GHz radio spectrum band.

20. The device of claim 1 wherein the device is used for radar.

21. The device of claim 20 wherein the radar is substantially operated in a 24 GHz or 77 GHz radio spectrum band.

22. The device of claim 20 wherein the radar is used for automotive radar.

23. The device of claim 1 wherein the receiver comprises a distributed active phase combing circuit including a combining tree using differential routing transmission lines.

24. The device of claim 1 wherein the at least a selected one of said receiver section and said transmitter section comprise dual conversion circuit topologies and at least two oscillator frequencies wherein all of the oscillator signals are derived from a common oscillator situated on the phased array mm-wave device.

25. The device of claim 1 wherein the device is implemented in BiCMOS.

26. The device of claim 1 wherein the device in implemented in CMOS.

27. The device of claim 1 wherein the device in implemented in a silicon based technology.

28. The device of claim 27 wherein the device further comprises germanium.

29. A mm-wave loopback method comprising the steps of:
providing an integrated receiver transmitter system on one or more substrates including an integral phased array antenna system, said integrated receiver transmitter system comprising at least one of a phased array mm-wave device having:
a single silicon substrate;
mm-wave circuitry comprising at least a selected one of:
a transmitter section comprising:
a mm-wave transmitter integrated onto said substrate, said transmitter configured to transmit a mm-wave signal; and
a first phased array antenna system integrated onto said substrate, said first phased array antenna system electrically coupled to said mm-wave transmitter, said first phased array antenna system including two or more antenna elements; and
a receiver section comprising:
a mm-wave receiver integrated onto said substrate, said receiver configured to receive a mm-wave signal; and
a second phased array antenna system integrated onto said substrate, said second array antenna system electrically coupled to said mm-wave receiver, said second phased array antenna system including two or more antenna elements; and
one or more dielectric lenses operatively coupled to at least a selected one of said first phased array antenna system and said second phased array antenna system to improve the transmission or the reception of mm-waves from or by the respective phased array antenna system;
wherein all of the mm-wave circuitry is integrated onto said substrate, thereby eliminating a need to couple mm-wave signals off said substrate;
coupling a transmitter signal from a transmitter output to a receiver input; and
testing the integrated receiver transmitter system on one or more substrates by varying a baseband input to the transmitter and observing a baseband receiver output.

30. The method of claim 29 further comprising the step of calibrating a plurality of phase shifters to account for fixed phase errors.

* * * * *